(12) United States Patent
Chae et al.

(10) Patent No.: US 11,157,110 B2
(45) Date of Patent: Oct. 26, 2021

(54) ELECTRONIC DEVICE AND CONTROL METHOD FOR ELECTRONIC DEVICE

(71) Applicant: Samsung Electronics Co., Ltd., Gyeonggi-do (KR)

(72) Inventors: Iljoo Chae, Gyeonggi-do (KR); Sungjun Lee, Gyeonggi-do (KR); Hyoungyoun Na, Gyeonggi-do (KR); Jeongsik Mun, Gyeonggi-do (KR); Bohwa Chung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/981,774

(22) PCT Filed: Apr. 11, 2019

(86) PCT No.: PCT/KR2019/004376
§ 371 (c)(1),
(2) Date: Sep. 17, 2020

(87) PCT Pub. No.: WO2019/199086
PCT Pub. Date: Oct. 17, 2019

(65) Prior Publication Data
US 2021/0117068 A1    Apr. 22, 2021

(30) Foreign Application Priority Data

Apr. 11, 2018 (KR) .................. 10-2018-0042317

(51) Int. Cl.
*G06F 3/041* (2006.01)
*G06F 3/14* (2006.01)
*H04W 88/02* (2009.01)

(52) U.S. Cl.
CPC ........ *G06F 3/04186* (2019.05); *G06F 3/1423* (2013.01); *G06F 2203/04104* (2013.01); *H04W 88/02* (2013.01)

(58) Field of Classification Search
CPC .............. G06F 3/04186; G06F 3/1423; G06F 2203/04104; H04W 88/02
See application file for complete search history.

(56) References Cited

U.S. PATENT DOCUMENTS 8,810,533 B2 *  8/2014  Chen ..................... G06F 3/0488
                                                      345/173
9,001,149 B2 *  4/2015  Sirpal .................. G06F 3/04842
                                                      345/619

(Continued)

FOREIGN PATENT DOCUMENTS

JP          5841109 B2     1/2016
KR    10-2011-0049542 A    5/2011

(Continued)

*Primary Examiner* — Dmitriy Bolotin
(74) *Attorney, Agent, or Firm* — Cha & Reiter, LLC.

(57) ABSTRACT

An electronic device is disclosed. The disclosed electronic device comprises a first touch screen display, a second touch screen display, a processor, and a memory, wherein the memory, when executed, can store instructions configured such that the processor determines, to be one touch event, a signal corresponding to a first touch input and a signal corresponding to a second touch input on the basis of the area of the first touch input and/or the area of the second touch input when the signal corresponding to the first touch input is received through the first touch screen display and the signal corresponding to the second touch input is received sequentially, or substantially at the same time, by the second touch screen display. Additional various embodiments are possible.

16 Claims, 13 Drawing Sheets

(56) References Cited

U.S. PATENT DOCUMENTS

| | | | |
|---|---|---|---|
| 9,075,558 B2* | 7/2015 | Reeves | G02B 6/0001 |
| 9,582,236 B2* | 2/2017 | Rasmussen | G06F 1/1647 |
| 9,588,545 B2* | 3/2017 | Sirpal | G06F 3/0483 |
| 10,082,947 B2* | 9/2018 | Kohashi | G06F 3/0486 |
| 10,222,900 B2 | 3/2019 | Jeong et al. | |
| 10,228,728 B2* | 3/2019 | Seo | G06F 1/1616 |
| 10,241,627 B2 | 3/2019 | Yoon | |
| 10,534,531 B2* | 1/2020 | Seo | H04M 1/0214 |
| 10,635,295 B2* | 4/2020 | Seo | G06F 3/1423 |
| 2010/0188352 A1* | 7/2010 | Ikeda | G06F 1/1647 |
| | | | 345/173 |
| 2010/0231536 A1* | 9/2010 | Chaudhri | G06F 3/0488 |
| | | | 345/173 |
| 2012/0084694 A1* | 4/2012 | Sirpal | G06F 3/0488 |
| | | | 715/769 |
| 2012/0084719 A1* | 4/2012 | Sirpal | G06F 3/04845 |
| | | | 715/799 |
| 2012/0084739 A1* | 4/2012 | Sirpal | G06F 3/04845 |
| | | | 715/863 |
| 2012/0242702 A1* | 9/2012 | Sirpal | H04M 1/0256 |
| | | | 345/649 |
| 2014/0300557 A1* | 10/2014 | Cho | G06F 1/1637 |
| | | | 345/173 |
| 2015/0363064 A1* | 12/2015 | Kobayashi | G06F 1/1616 |
| | | | 715/769 |
| 2016/0062554 A1* | 3/2016 | Sirpal | G06F 3/017 |
| | | | 715/761 |
| 2016/0110010 A1* | 4/2016 | Lee | G06F 1/1643 |
| | | | 345/173 |
| 2016/0239173 A1 | 8/2016 | Warner | |
| 2017/0052698 A1* | 2/2017 | Seo | G06F 3/0486 |
| 2017/0185212 A1* | 6/2017 | Jeong | G06F 3/0416 |
| 2019/0121486 A1* | 4/2019 | Jeong | G06F 3/0416 |

FOREIGN PATENT DOCUMENTS

| | | |
|---|---|---|
| KR | 10-2015-0080842 A | 7/2015 |
| KR | 10-2016-0100187 A | 8/2016 |
| KR | 10-2017-0029756 A | 3/2017 |
| KR | 10-2017-0076359 A | 7/2017 |
| KR | 10-2017-0097521 A | 8/2017 |

* cited by examiner

FIG. 1
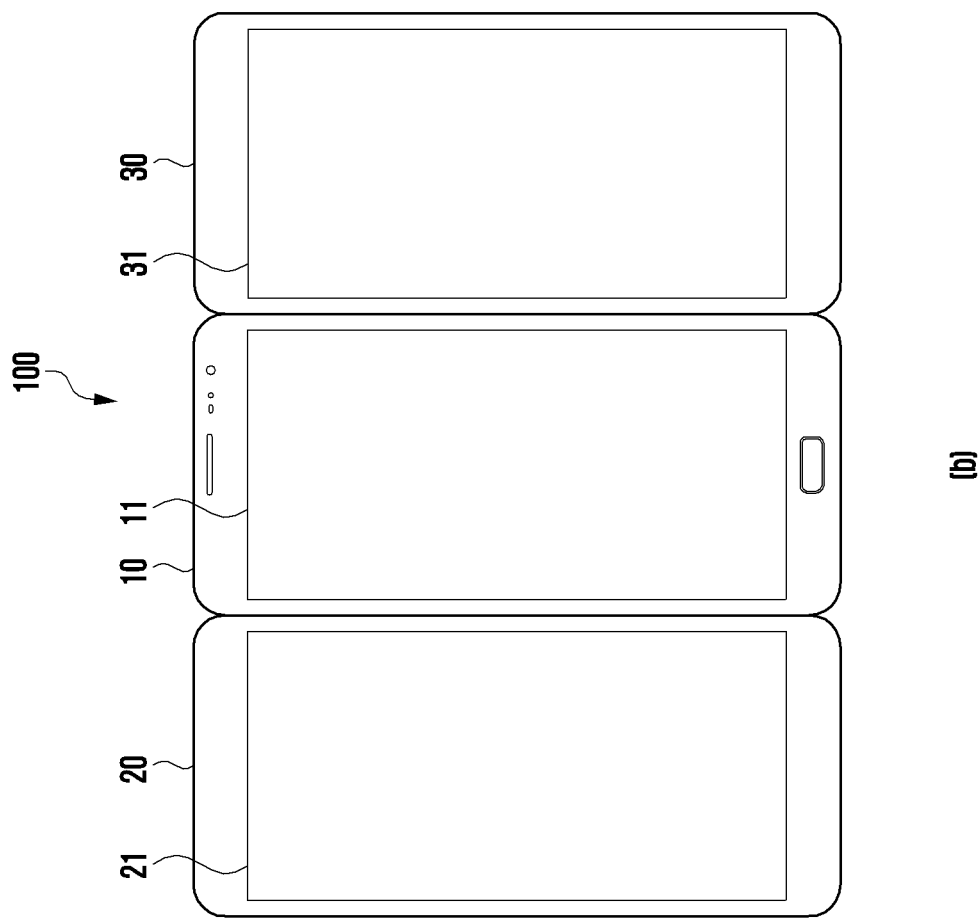
(b)
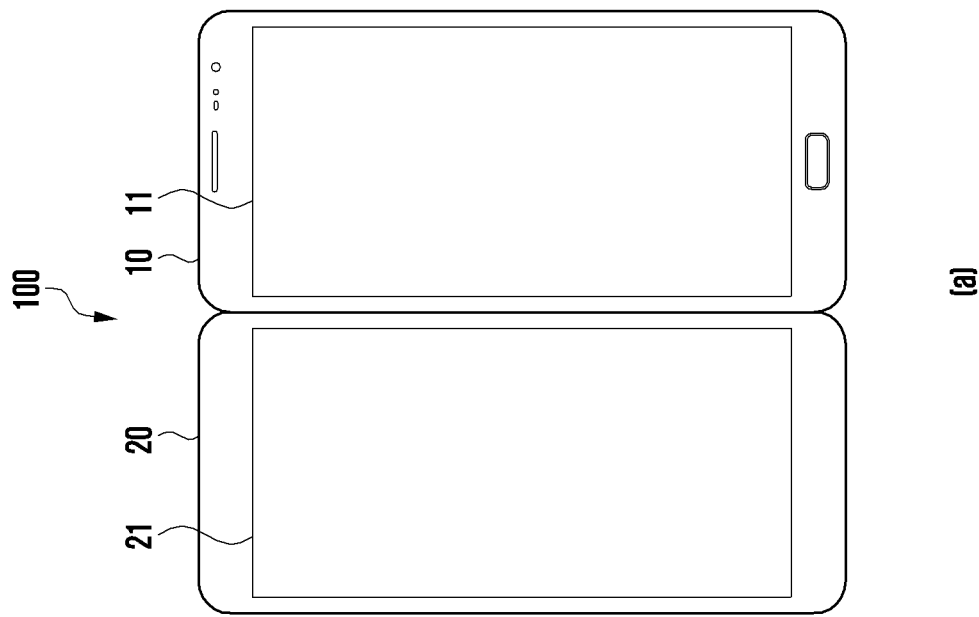
(a)

FIG. 7
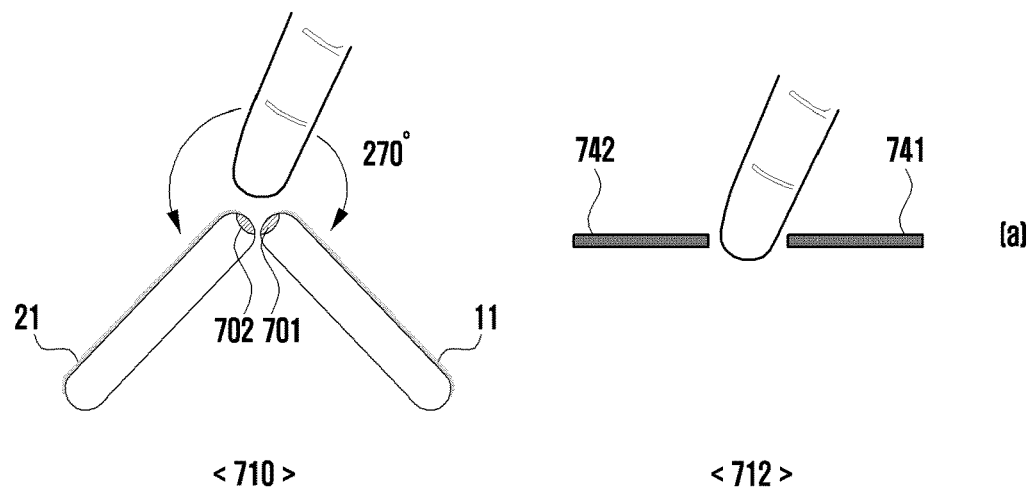
<710>  <712>  (a)
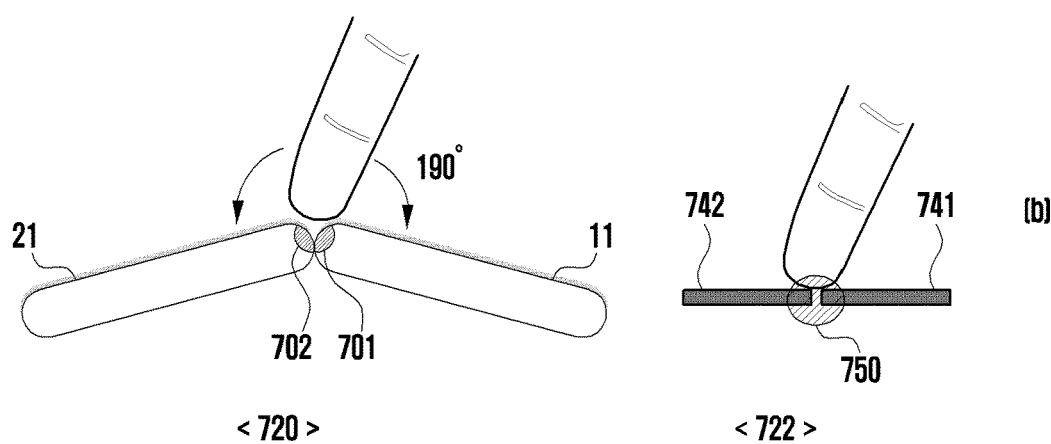
<720>  <722>  (b)
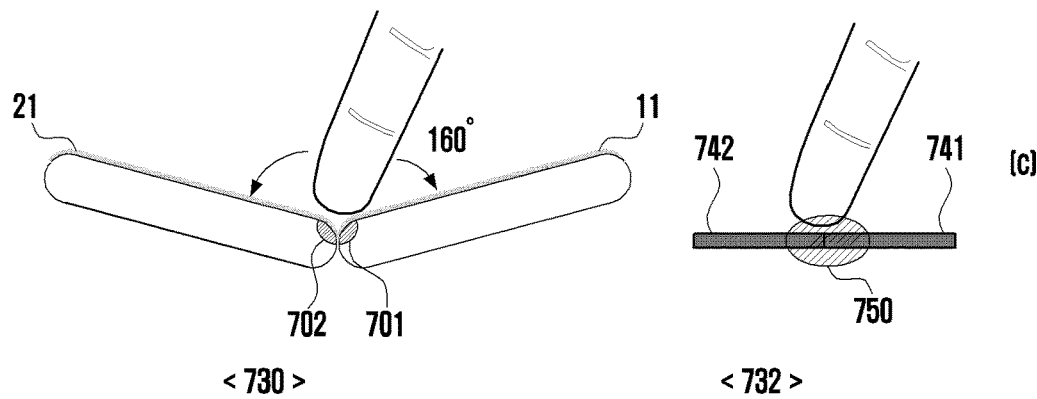
<730>  <732>  (c)

ELECTRONIC DEVICE AND CONTROL METHOD FOR ELECTRONIC DEVICE

CROSS-REFERENCE TO RELATED APPLICATIONS

This application is a National Phase Entry of PCT international Application No. PCT/KR2019/004,376, which was filed on Apr. 11, 2019, and claims priority to Korean Patent Application No. 10-2018-0042317 filed on Apr. 11, 2018, in the Korean Intellectual Property Office, the contents of which are incorporated herein by reference.

TECHNICAL FIELD

Embodiments disclosed in the disclosure relate to a touch input processing technology.

BACKGROUND ART

Electronic devices including multiple touchscreen displays have recently become extensively widespread. An electronic device including multiple touchscreen displays may support respective touchscreen displays so as to output different screens (or images).

For example, an electronic device may output different application execution screens through respective touchscreen displays. In addition, an electronic device including multiple touchscreen displays may support use of the multiple touchscreen displays as if a single touchscreen display.

For example, the electronic device may divide a single application execution screen into multiple regions, and may separately output execution screens corresponding to respective divided regions through respective touchscreen displays.

DISCLOSURE OF INVENTION

Technical Problem

When multiple touchscreen displays of a conventional electronic device are used as if a single touchscreen screen, it may be difficult to individually process touch inputs which are successively input to respective touchscreen displays, or which are substantially simultaneously input thereto, such that the multiple touchscreen displays are used as if a single touchscreen display.

Various embodiments of the disclosure may provide a touch input processing method and an electronic device supporting the same, wherein touch inputs which are input to different touchscreen displays successively or substantially simultaneously may be determined as a single touch event and processed accordingly.

Solution to Problem

An electronic device according to an embodiment may include: a first touchscreen display; a second touchscreen display; a processor; and a memory. The memory may store instructions configured to cause the processor, when executed, to determine, in case that a signal corresponding to a first touch input is received through the first touchscreen display, and in case that a signal corresponding to a second touch input is received through the second touchscreen display successively or substantially simultaneously, the signal corresponding to the first touch input and the signal corresponding to the second touch input as a single touch event, based on at least one of the area of the first touch input or the area of the second touch input.

A control method according to an embodiment may include the operations of: receiving a signal corresponding to a first touch input through a first touchscreen display and, successively or substantially simultaneously, receiving a signal corresponding to a second touch input through a second touchscreen display; and determining the signal corresponding to the first touch input and the signal corresponding to the second touch input as a single touch event, based on at least one of the area of the first touch input or the area of the second touch input.

Advantageous Effects of Invention

According to an embodiment of the disclosure, touch inputs occurring on different touchscreen displays may be processed as a single touch event, thereby preventing erroneous operations regarding touch inputs by the user who wants to use multiple touchscreen displays as if a single touchscreen display.

In addition, various advantageous effects inferred directly or indirectly through the disclosure may be provided.

BRIEF DESCRIPTION OF DRAWINGS

FIG. 1 illustrates an electronic device according to an embodiment.

FIG. 7 illustrates a situation in which an electronic device according to an embodiment determines to process a touch event according to the opening/closing situation of multiple touchscreen displays.

MODE FOR THE INVENTION

Figure 2:
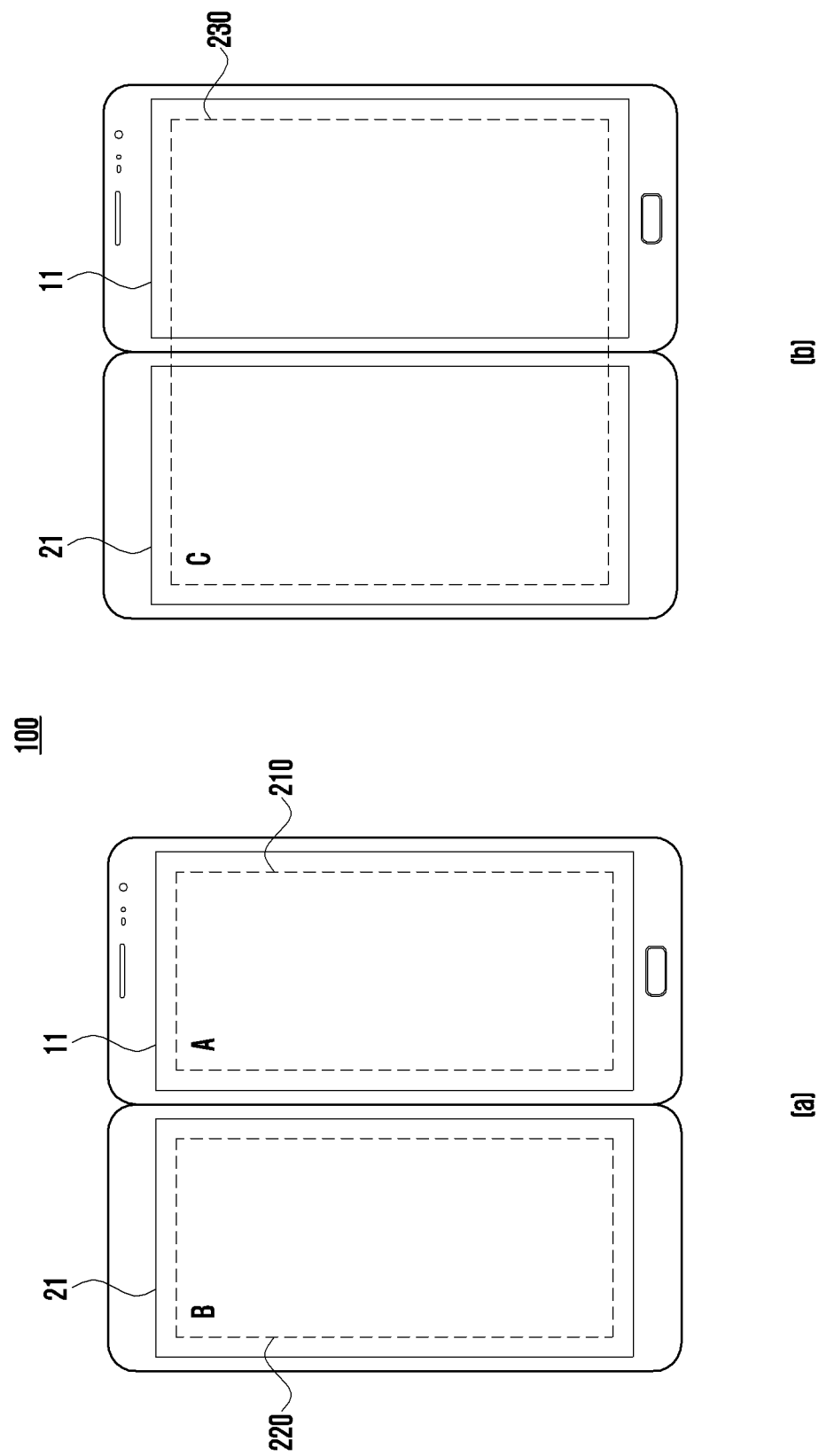
FIG. 2 illustrates a situation in which an electronic device according to an embodiment uses multiple touchscreen displays.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 illustrates an electronic device according to an embodiment.

FIG. 1A is a diagram illustrating an electronic device having two touchscreen displays according to an embodiment. FIG. 1B is a diagram illustrating an electronic device having three touchscreen displays according to an embodiment.

Referring to FIG. 1A, the electronic device 100 may include a first housing 10, a second housing 20, a first touchscreen display 11, and a second touchscreen display 21. The first housing 10 and the second housing 20 may be connected to each other, thereby forming the exterior of the electronic device 100, and may provide a space in which components of the electronic device 100 may be seated. According to an embodiment, the first touchscreen 11 may be seated on the first housing 10, and the second touchscreen 21 may be seated on the second housing 20.

According to an embodiment, the first housing 10 and the second housing 20 may rotate around one side thereof such that they are opened/closed with regard to each other. For example, the first housing 10 and the second housing 20 may rotate around a region in which they are connected to each other. Referring to FIG. 1A, they may rotate with regard to each other at the left end of the first housing 10 and the right end part of the second housing 20.

According to an embodiment, when the front surface of the electronic device 100 is viewed while the first housing 10 and the second housing 20 are open, the first touchscreen display 11 may be exposed through the front surface of the first housing 10, and the second touchscreen display 21 may be exposed through the front surface of the second housing 20. In addition, if the first housing 10 and the second housing 20 are closed in such a direction that the front surface of the first housing 10 and the front surface of the second housing 20 face each other, they may be closed in such a direction that the first touchscreen display 11 exposed through the front surface of the first housing 10 and the second touchscreen display 21 exposed through the front surface of the second housing 20 face each other.

According to an embodiment, in a state in which the first touchscreen display 11 and the second touchscreen display 21 are open, the electronic device 100 may output different application execution screens through the first touchscreen display 11 and the second touchscreen display 21, respectively, or may divide an application execution screen and separately output the divided parts through the first touchscreen display 11 and the second touchscreen display 21, respectively.

FIG. 1B is a diagram illustrating an electronic device having three touchscreen displays according to an embodiment.

Referring to FIG. 1B, the electronic device 100 may include a first housing 10, a second housing 20, a third housing 30, a first touchscreen display 11, a second touchscreen display 21, and a third touchscreen display 31. The first housing 10, the second housing 20, and the third housing 30 may be connected to each other, thereby forming the exterior of the electronic device 100. For example, the left end of the first housing 10 and the right end of the second housing 20 may be connected to each other, and the right end of the first housing 10 and the left end of the third housing 30 may be connected to each other.

According to an embodiment, the first housing 10, the second housing 20, and the third housing 30 may provide spaces in which components of the electronic device 100 may be seated. According to an embodiment, the first touchscreen 11 may be seated on the first housing 10, the second touchscreen 21 may be seated on the second housing 20, and the third touchscreen display 31 may be seated on the third housing 30.

According to an embodiment, the first housing 10 and the second housing 20 may rotate around one side thereof such that they are opened/closed with regard to each other, and the first housing 10 and the third housing 30 may also rotate around one side thereof such that they are opened/closed with regard to each other. For example, the first housing 10 and the second housing 20 may rotate around a region in which they are connected to each other, and the first housing 10 and the third housing 30 may also rotate around a region in which they are connected to each other.

According to an embodiment, when the front surface of the electronic device 100 is viewed while the first housing 10, the second housing 20, and the third housing 30 are open, the first touchscreen display 11 may be exposed through the front surface of the first housing 10, the second touchscreen display 21 may be exposed through the front surface of the second housing 20, and the third touchscreen display 31 may be exposed through the front surface of the third housing 30.

According to an embodiment, if the first housing 10 and the second housing 20 are closed in such a direction that the front surface of the first housing 10 and the front surface of the second housing 20 face each other, they may be closed in such a direction that the first touchscreen display 11 exposed through the front surface of the first housing 10 and the second touchscreen display 21 exposed through the front surface of the second housing 20 also face each other. Alternatively, if the first housing 10 and the third housing 30 are closed in such a direction that the front surface of the first housing 10 and the front surface of the third housing 30 face each other, they may be closed in such a direction that the first touchscreen display 11 exposed through the front surface of the first housing 10 and the third touchscreen display 31 exposed through the front surface of the third housing 30 also face each other.

According to an embodiment, in a state in which the first touchscreen display 11, the second touchscreen display 21, and the third touchscreen display 31 are all open, the electronic device 100 may output different application execution screens through the first touchscreen display 11, the second touchscreen display 21, and the third touchscreen display 31, respectively, or may divide an application execution screen and separately output the divided parts through at least two touchscreen displays among the first touchscreen display 11, the second touchscreen display 21, and the third touchscreen display 31, respectively.

According to an embodiment, in a state in which at least one of the first touchscreen display 11, the second touchscreen display 21, and the third touchscreen display 31 is closed, the electronic device 100 may output application execution screens through open-state touchscreen displays only.

Although electronic devices having two touchscreen displays and three touchscreen displays have been described above with reference to FIG. 1A and FIG. 1B, respectively, the number of touchscreen displays included in the electronic device is not limited thereto.

In addition, although it has been assumed in the above description that the electronic device outputs screens according to the opening/closing state of touchscreen displays, this is not limiting in any manner. According to various embodiments, the screen output may be determined according to whether or not the screen of a touchscreen display is exposed to the user. For example, if housings connected to each other are rotated in the rearward direction (for example, direction in which no touchscreen displays are exposed) such that rear surfaces of the housings face each other (for example, if housings are folded backwards), the touchscreen display positioned in such a direction that the user can view the same may solely output a screen, and the touchscreen display positioned in such a direction that the user cannot view the same may output no screen.

FIG. 2 illustrates a situation in which an electronic device according to an embodiment uses multiple touchscreen displays.

Referring to FIG. 2, the electronic device 100 may include multiple touchscreen displays. For example, the electronic device 100 may include a first touchscreen display 11 and a second touchscreen display 21.

According to an embodiment, multiple touchscreen displays 11 and 21 may be disposed on different housings, respectively, and the different housings may be connected to each other, thereby forming the exterior of the electronic device 100.

According to an embodiment, in a state in which the first touchscreen display 11 and the second touchscreen display 21 are open, the electronic device 100 may operate the screens of the multiple touchscreen displays as separate screens or as a single integrated screen.

Referring to FIG. 2A, the electronic device 100 according to an embodiment may output an execution screen 210 for a first application (for example, application A) on the first touchscreen display 11, and may output an execution screen 220 for a second application (for example, application B) on the second touchscreen display 21.

Referring to FIG. 2B, the electronic device 100 according to an embodiment may output an execution screen 230 for a third application (for example, application C) on the first touchscreen display 11 and the second touchscreen display 21. For example, the electronic device 100 may output a partial region of the execution screen 230 for the third application on the first touchscreen display 11, and may output the remaining region other than the partial region of the execution screen 230 for the third application on the second touchscreen display 21.

Figure 3:
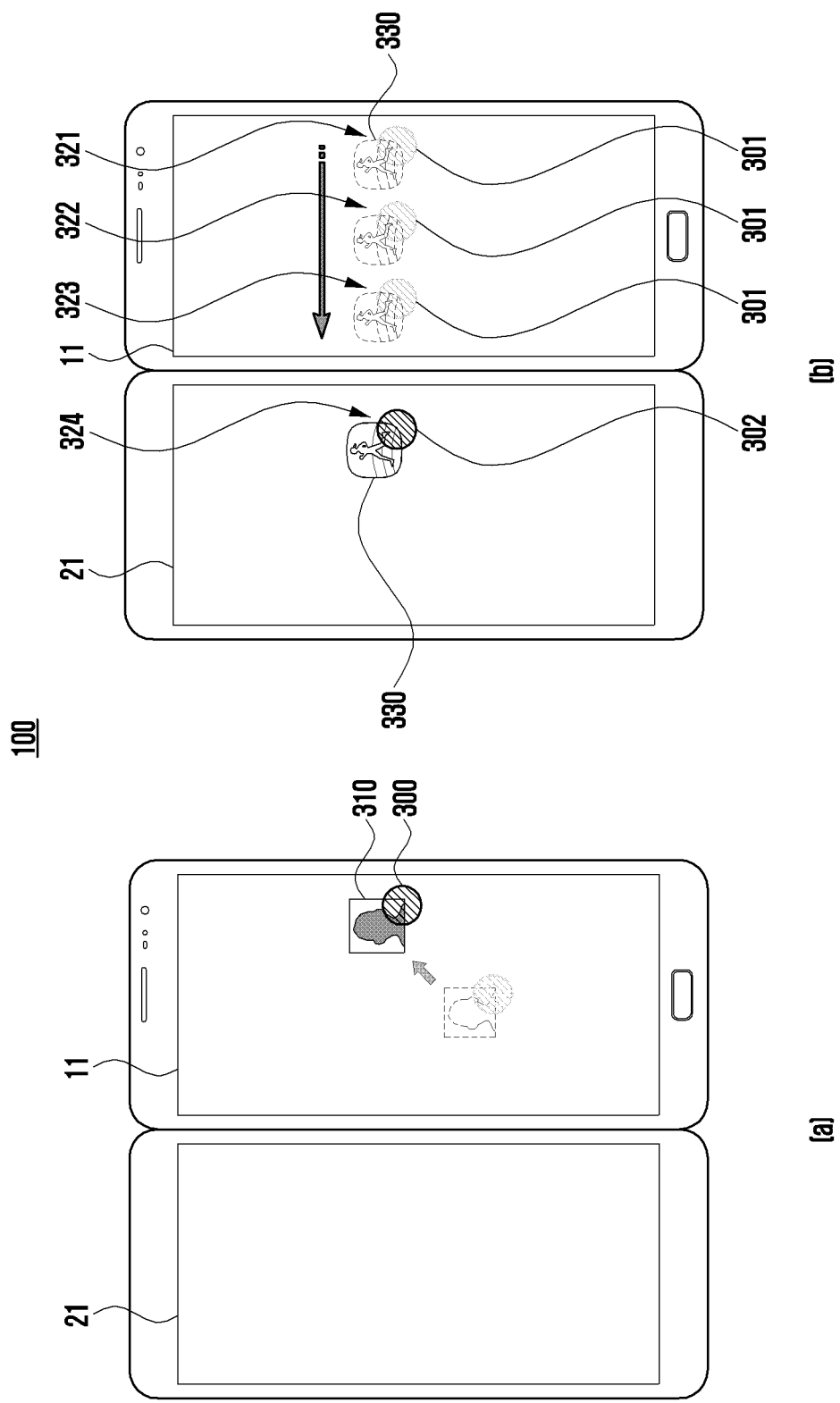
FIG. 3 illustrates a situation in which an electronic device according to an embodiment processes a touch event according to the area of a touch input.

FIG. 3 illustrates a situation in which an electronic device according to an embodiment processes a touch event according to the area of a touch input.

The touch input may refer to an action of the user contacting or pressing a partial region of a touchscreen display, for example. The touch event may refer to a single touch input or multiple touch inputs, for example, combined so as to determine a single function execution command (or signal) that the electronic device can execute.

Referring to FIG. 3, the electronic device 100 may include multiple touchscreen displays. For example, the electronic device 100 may include a first touchscreen display 11 and a second touchscreen display 21.

According to an embodiment, in a state in which the first touchscreen display 11 and the second touchscreen display 21 are open, the electronic device 100 may operate the screens of the multiple touchscreen displays as separate screens or a single integrated screen.

Referring to FIG. 3A, the electronic device 100 according to an embodiment may display a part of a list of applications installed in the electronic device 100 as execution objects on the first touchscreen display 11 and the second touchscreen display 21.

According to an embodiment, the electronic device 100 may execute an application corresponding to an execution object selected by the user from application execution objects displayed on the first touchscreen display 11 and the second touchscreen display 21.

According to an embodiment, the electronic device 100 may move the position of execution objects displayed on the first touchscreen display 11 and the second touchscreen display 21. For example, if the electronic device 100 receives a touch input 300 of touching an execution object 310 displayed on the first touchscreen display 11 for a specific time and then dragging the same, the electronic device 100 may display the execution object 310 while moving the same along the drag direction.

Referring to FIG. 3B, the electronic device 100 according to an embodiment may determine multiple touch inputs as a single touch event, based on the area of the touch inputs. For example, if a first touch input 301 occurs on the first touchscreen display 11, if the first touch input 301 is released in the region of boundary between the first touchscreen display 11 and the second touchscreen display 21, and if a second touch input 302 occurs on the second touchscreen display 21, the electronic device 100 may determine the first touch input 301 and the second touch input 302 as a single touch event, based on the change in area of the first touch input 301 and/or the second touch input 302. For example, if a signal corresponding to the first touch input 301 is received on the first touchscreen display 11, and if a signal corresponding to the second touch input 302 is successively received on the second touchscreen display 21, the electronic device 100 may determine the first touch input 301 and the second touch input 302 as a single touch event.

According to an embodiment, reception of a signal corresponding to the first touch input 301 and reception of a signal corresponding to the second touch input 302 may be determined in view of the rate at which the first touch input 301 is dragged and the physical interval between the first touchscreen display 11 and the second touchscreen display 21.

For example, if the rate of movement of the first touch input 301 is 200 mm/s, and if the interval between the first touchscreen display 11 and the second touchscreen display 21 is 20 mm, the time between release of the first touch input 301 on the first touchscreen display 11 and the occurrence of the second touch input 302 on the second touchscreen display 21 may be 100 ms. In addition, the time needed by the electronic device 100 to recognize the second touch input 302 occurring on the second touchscreen display 21 and to produce a signal is 16 ms, and the time between release of the first touch input 301 and subsequent occurrence of the second touch input 302 may be 116 ms.

Referring to FIG. 3B, the electronic device 100 according to an embodiment may identify a first touch input 301 starting from a first position 321 and moving to a third position 323 via a second position 322. The first touch input 301 may be an input of touching and dragging an execution object 330 displayed on the first touchscreen display 11. The third position 323 may be a region adjacent to a corner of the first touchscreen display 11, for example, and the corner may be adjacent to the second touchscreen display 21.

According to an embodiment, if the first touch input 301 moves, the electronic device 100 may acquire the area of the first touch input 301 at each configured time (for example, 0.1 ms). Upon identifying that the area of the first touch input 301 remains identical or is increasing, the electronic device 100 may estimate that the first touch input 301 is a touch input starting from the first touchscreen display 11 and moving towards the second touchscreen display 21.

According to an embodiment, after estimating that the first touch input 301 is a touch input moving towards the second touchscreen display 21, the electronic device 100 may identify that the first touch input 301 ends on the first touchscreen display 11. If the electronic device 100 identifies a second touch input 302 occurring in the fourth region 324 of the second touchscreen display 21, the electronic device 100 may determine a signal corresponding to the second touch input 302 occurring in the fourth region 324 and a signal corresponding to the first touch input 301 as a single touch event. Accordingly, the electronic device 100 may move the execution object 330, which is displayed on the first touchscreen display 11 so as to move following the movement of the first touch input 301, to the second touchscreen display 21 and may display the same thereon.

According to various embodiments, if the area of the second touch input 302 is equal to the area of the first touch input 301 or increases, the electronic device 100 may determine a signal corresponding to the first touch input 301 and a signal corresponding to the second touch input 302 as a single touch event.

According to various embodiments, the electronic device 100 may determine a signal corresponding to the first touch input 301 and a signal corresponding to the second touch input 302 as a single touch event by using the pressure of the touch inputs. For example, the electronic device 100 may acquire the pressure of the first touch input 301 at each preconfigured time (for example, 0.1 ms). Upon identifying that the pressure of the first touch input 301 remains identical or increases, the electronic device 100 may estimate that the first touch input 301 is a touch input starting from the first touchscreen display 11 and moving to the second touchscreen display 21.

According to an embodiment, upon identifying that the first touch input 301 is ended on the first touchscreen display 11, and that a second touch input 302 is received on the second touchscreen display 21, the electronic device 100 determine a signal corresponding to the first touch input 301 and a signal corresponding to the second touch input 302 as a single touch event.

Figure 4:
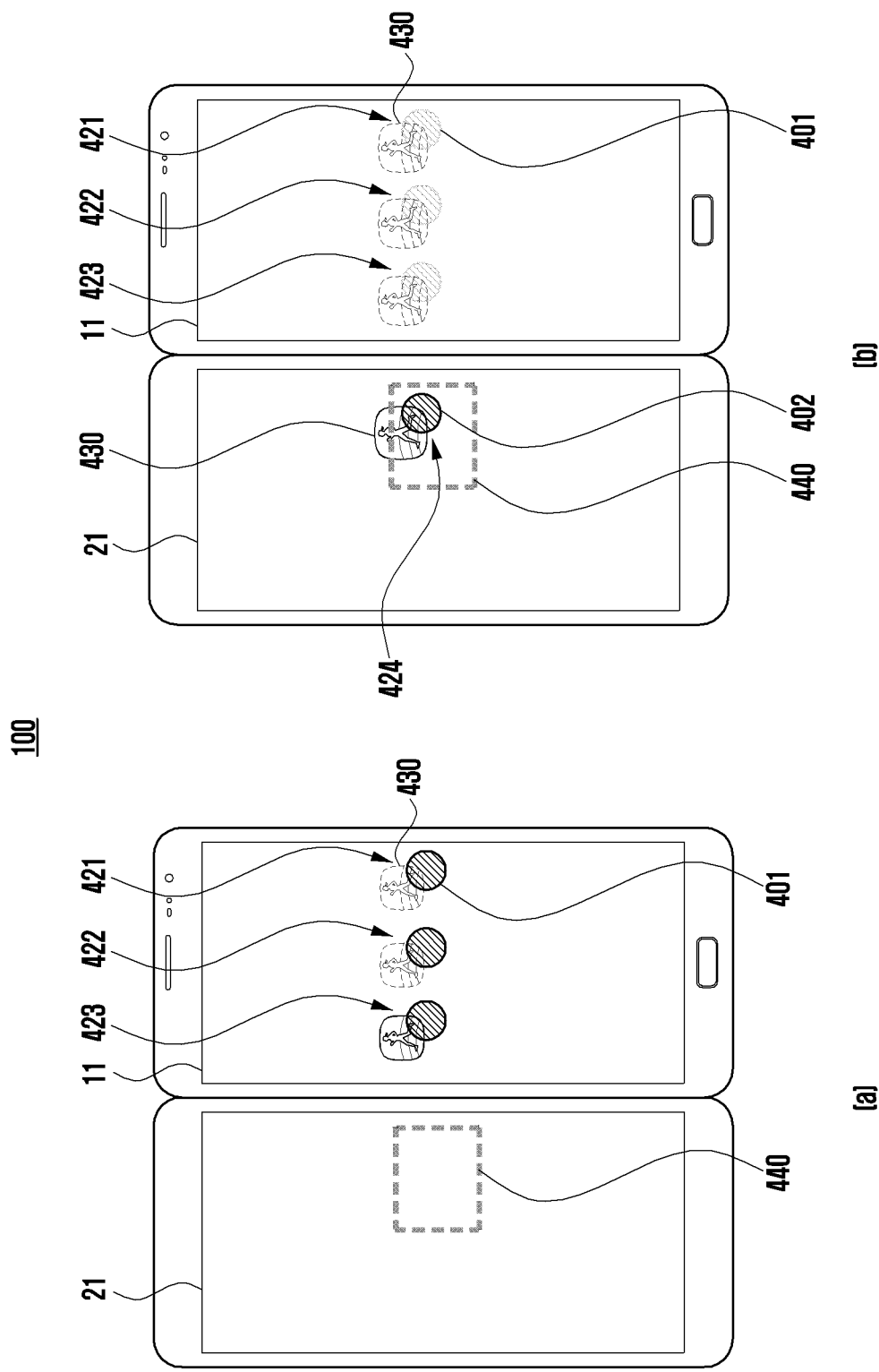
FIG. 4 illustrates a situation in which an electronic device according to an embodiment processes a touch event according to the direction of movement of a touch input or the distance of movement thereof.

FIG. 4 illustrates a situation in which an electronic device according to an embodiment processes a touch event according to the direction of movement of a touch input or the distance of movement thereof.

Referring to FIG. 4, the electronic device 100 may include multiple touchscreen displays. For example, the electronic device 100 may include a first touchscreen display 11 and a second touchscreen display 21.

According to an embodiment, in a state in which the first touchscreen display 11 and the second touchscreen display 21 are open, the electronic device 100 may operate the screens of the multiple touchscreen displays as separate screens or as a single integrated screen.

Referring to FIGS. 4A and 4B, the electronic device 100 may determine multiple touch inputs as a single touch event, based on the direction of movement of the touch inputs or the distance of movement thereof. For example, if a first touch input 401 occurs on the first touchscreen display 11, if the first touch input 401 is released in the region of boundary between the first touchscreen display 11 and the second touchscreen display 21, and if a second touch input 402 occurs on the second touchscreen display 21, the electronic device 100 may determine a signal corresponding to the first touch input and a signal corresponding to the second touch input as a single touch event, based on the direction of movement of the first touch input 401 or the distance of movement thereof.

Referring to FIG. 4A, the electronic device 100 according to an embodiment may identify the occurrence of a first touch input 401 in a first position 421. The electronic device 100 may identify the movement of the first touch input 401 from the first position 421 to a second position 422 and a third position 423. In this case, the first touch input 401 may be, for example, a touch-and-drag input for selecting a function execution object 430 in the first position 421 and then moving the same.

According to an embodiment, the electronic device 100 may acquire the direction of movement, per unit time, of the first touch input 401 moving from the first position 421 to the third position 423 via the second position 422, or the distance of movement thereof per unit time. The electronic device 100 may estimate whether or not there in a region 440 on the second touchscreen 21, in which a touch input is sensed, by using the direction of movement, per unit time, of the first touch input 401 on the first touchscreen display 11 or the distance of movement thereof.

For example, upon identifying that the position of the first touch input 401 successively approaches a position on the second touchscreen display 21, the electronic device 100 may estimate that a touch input may be produced on the second touchscreen display 21.

Referring to FIG. 4B, if the first touch input 401 on the first touchscreen display 11 is ended after the possibility that a touch input will be produced on the second touchscreen display 21 is estimated, the electronic device 100 may estimate at least one of an region 440 on the second touchscreen display 21, in which a touch input is sensed, or the time at which a touch input is sensed.

For example, the electronic device 100 may derive the direction and distance of movement of the first touch input 401 per unit time, based on the movement of the first touch input 401 from the first position 421 to the third position 423 via the second position 422. The electronic device 100 may estimate the region 440 on the second touchscreen display 21, in which a touch input is sensed, and the time at which the touch input is sensed, based on the derived direction and distance of movement of the first touch input 401 per unit time.

According to an embodiment, if a second touch input 402 occurs in the region 440 on the second touchscreen display 21, in which a touch input is sensed, or within the time during which the touch input is sensed after the first touch input 401 on the first touchscreen display 11 is ended, the electronic device 100 may determine a signal corresponding to the second touch input 402 and a signal corresponding to the first touch input 401 produced on the first touchscreen display 11 as a single touch event.

For example, if a second touch input 402 occurs in a fourth region 424 included in the area 440 in which a touch input may occur, the electronic device 100 may determine a signal corresponding to the first touch input 401 and a signal corresponding to the second touch input 402 as a touch-and-drag event starting from the first touchscreen display 11 and continuing to the second touchscreen display 21.

According to an embodiment, if a second touch input 402 occurs on the second touchscreen display 21 within the expected time of occurrence of a touch input, the electronic device 100 may determine a signal corresponding to the first touch input 401 and a signal corresponding to the second touch input 402 as a touch-and-drag event starting from the first touchscreen display 11 and continuing to the second touchscreen display 21.

According to various embodiments, the electronic device 100 may apply, in a parallel manner, the method of determining a signal corresponding to the first touch input and a signal corresponding to the second touch input as a single touch event by using the area or pressure, described with reference to FIG. 3, and the method of determining a signal corresponding to the first touch input and a signal corresponding to the second touch input as a single touch event by using the direction of movement of a touch input or the distance of movement thereof, described with reference to FIG. 4.

Figure 5:
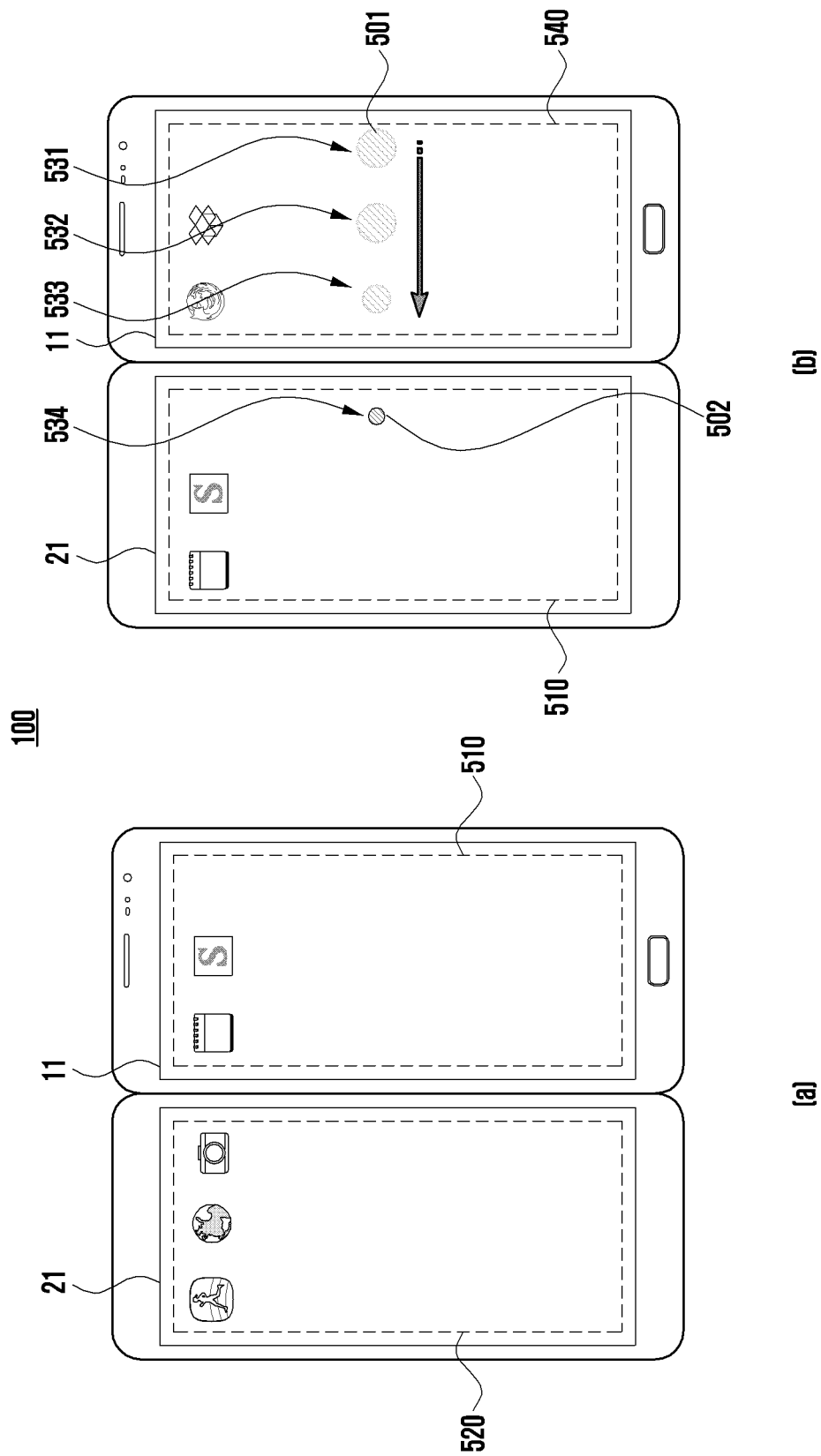
FIG. 5 illustrates another situation in which an electronic device according to an embodiment processes a touch event according to the area of an occurring touch input.

FIG. 5 illustrates another situation in which an electronic device according to an embodiment processes a touch event according to the area of an occurring touch input.

Referring to FIG. 5A, the electronic device 100 may display a part of a list of applications installed in the electronic device 100 as execution objects on a first touchscreen display 11 and a second touchscreen display 21. For example, the electronic device 100 may produce multiple home screens. The home screens may be screens for displaying execution objects of applications installed in the electronic device 100, for example.

According to an embodiment, the electronic device 100 may display, among the multiple home screens, two (for example, first home screen 510 and second home screen 520) on the first touchscreen display 11 and the second touchscreen display 21. In this case, other screens displaying execution objects may not yet be displayed on the displays.

Referring to FIG. 5B, the electronic device 100 may determine multiple touch inputs as a single touch event, based on the area of each touch input. For example, if a first touch input 501 occurs on the first touchscreen display 11, if the first touch input 501 is released in the region of boundary between the first touchscreen display 11 and the second touchscreen display 21, and if a second touch input 502 then occurs on the second touchscreen display 21, the electronic device 100 may determine a signal corresponding to the first touch input 501 and a signal corresponding to the second touch input 502 as a single touch event, based on the area of the first touch input 501.

Referring to FIG. 5B, the electronic device 100 may identify a first touch input 501 starting from a first position 531 and moving to a third position 533 via a second position 532. The third position 533 may be a region adjacent to a corner of the first touchscreen display 11, for example, and the corner may be adjacent to the second touchscreen display 21.

According to an embodiment, if the first touch input 501 is moving, the electronic device 100 may acquire the area of the first touch input 501 at each configured time (for example, 0.1 ms). Upon identifying that the area of the first touch input 501 decreases continuously, the electronic device 100 may estimate that a signal corresponding to the first touch input 501 is a touch event (for example, flicking input) intended to display a home screen 510 displayed on the first touchscreen display 11 on the second touchscreen display 21 and to display a non-displayed home screen on the second touchscreen display 21.

In this case, upon identifying a second touch input 502 occurring on the second touchscreen display 21 after the first touch input 501 on the first touchscreen display 11 is ended, the electronic device 100 may determine a signal corresponding to the second touch input 502 occurring in a fourth region 534 and a signal corresponding to the first touch input 501 as a single touch event (for example, flicking input). Accordingly, the electronic device 100 may display the first home screen 510, which has been displayed on the first touchscreen display 11 so as to move toward the second touchscreen display 21 according to the movement of the first touch input 501, on the second touchscreen display 21, and may display a home screen (for example, third home screen 540), which has not been displayed, on the first touchscreen display 11.

According to various embodiments, the electronic device 100 may determine a signal corresponding to a first touch input and a signal corresponding to a second touch input as a single touch event, by using the pressure of each touch input. For example, the electronic device 100 may acquire the pressure of a first touch input 501 at each configured time (for example, 0.1 ms). Upon identifying that the pressure of the first touch input 501 decreases continuously, the electronic device 100 may estimate that the first touch input 501 is a touch event (for example, flicking input) intended to display a home screen 510 displayed on the first touchscreen display 11 on the second touchscreen display 21 and to display a non-displayed home screen on the first touchscreen display 11. In this case, upon identifying a second touch input 502 occurring on the second touchscreen display 21 after the first touch input 501 on the first touchscreen display 11 is ended, the electronic device 100 may determine a signal corresponding to the second touch input 502 occurring in a fourth region 534 and a signal corresponding to the first touch input 501 as a single touch event (for example, flicking input). Accordingly, the electronic device 100 may display the first home screen 510, which has been displayed on the first touchscreen display 11 so as to move toward the second touchscreen display 21 according to the movement of the first touch input 501, on the second touchscreen display 21, and may display a home screen (for example, third home screen 540), which has not been displayed, on the first touchscreen display 11.

Figure 6:
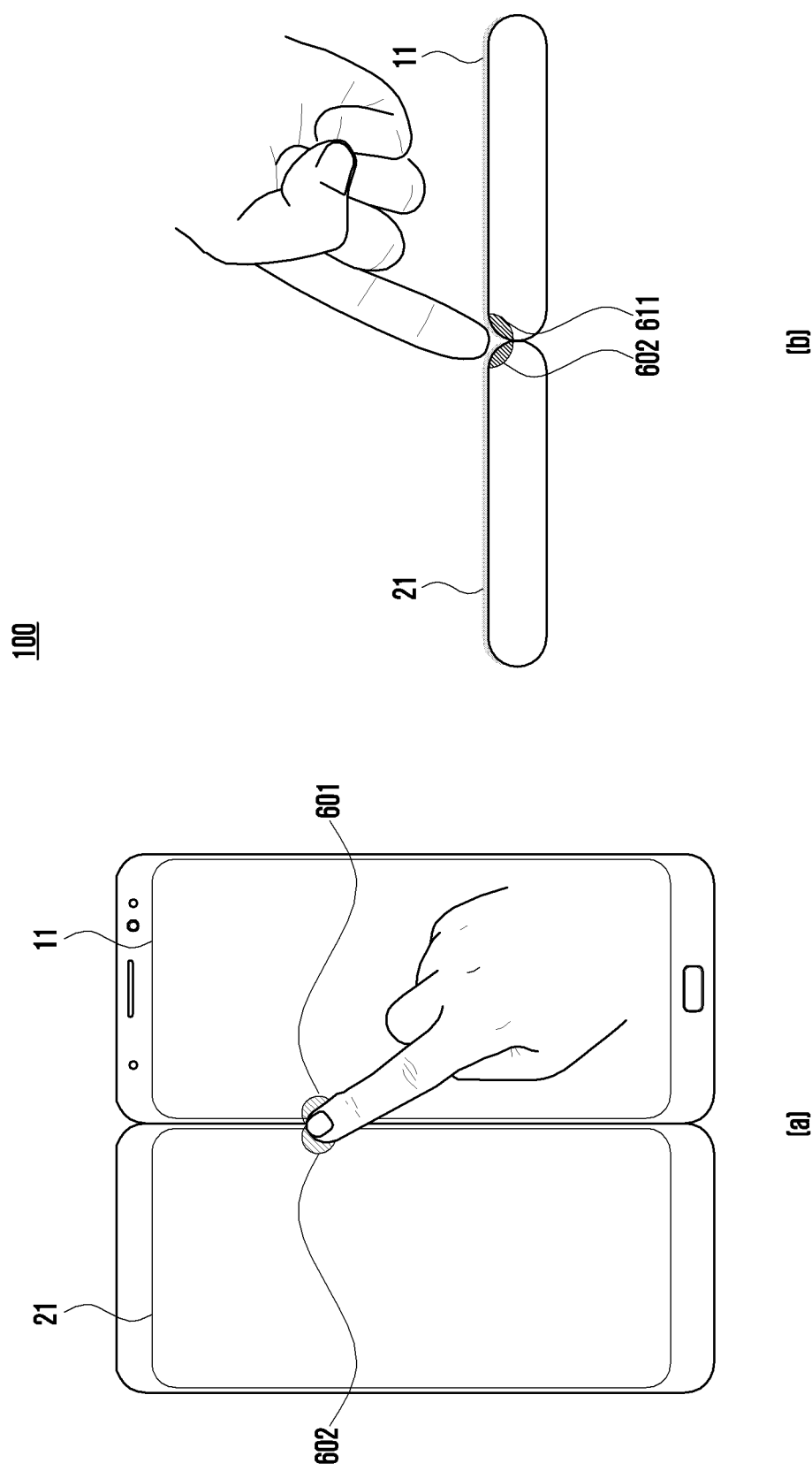
FIG. 6 illustrates another situation in which an electronic device according to an embodiment processes a touch event according to the area of an occurring touch input.

FIG. 6 illustrates another situation in which an electronic device according to an embodiment processes a touch event according to the area of an occurring touch input.

Referring to FIG. 6, the electronic device 100 may include multiple touchscreen displays 11 and 21.

According to an embodiment, in a state in which the first touchscreen display 11 and the second touchscreen display 21 are open, the electronic device 100 may identify a first touch input 601 and a second touch input 602 substantially simultaneously occurring on the multiple touchscreen displays 11 and 21.

For example, as in FIG. 6A, in a situation in which the left corner of the first touchscreen display 11 and the right corner of the second touchscreen display 21 are close to each other, the electronic device 100 may identify a first touch input 601 and a second touch input 602 substantially simultaneously occurring on the two touchscreen displays 11 and 21.

Alternatively, as in FIG. 6B, if the touchscreen displays 11 and 21 include displays that are bent such that corners thereof are adjacent to each other, the above situation may occur frequently.

According to an embodiment, upon identifying a first touch input 601 and a second touch input 602 substantially simultaneously occurring on the first touchscreen display 11 and the second touchscreen display 21, the electronic device 100 may determine a signal corresponding to the first touch input 601 and a signal corresponding to the second touch input 602 as a single touch event.

For example, the electronic device 100 may compare the area of the first touch input 601 with the area of the second touch input 602, may identify a touch input having a wider area as an effective touch input, and may determine the touch input having a wider area as a single touch event.

According to various embodiments, the electronic device 100 may compare the pressure of the first touch input 601 with the pressure of the second touch input 602, may identify a touch input having a higher pressure as an effective touch input, and may determine the touch input having a higher pressure as a single touch event.

FIG. 7 illustrates a situation in which an electronic device according to an embodiment determines to process a touch event according to the opening/closing situation of multiple touchscreen displays.

According to an embodiment, according to the degree of opening/closing of a first touchscreen display 11 and a second touchscreen display 21, the electronic device 100 may determine a first touch input occurring on the first touchscreen display 11 and a second touch input occurring on the second touchscreen display 21 as a single touch event.

According to an embodiment, the electronic device 100 may determine a region (for example, event determination region) in the first touchscreen display 11 and the second touchscreen display 21 such that, if a first touch input and a second touch input occur substantially simultaneously, an operation of determining the same as a single touch event is performed therein. For example, if a first touch input and a second touch input occur substantially simultaneously in the event determination region, the electronic device 100 may determine the same as a single touch event.

According to an embodiment, the description that a first touch input 601 and a second touch input 602 occur substantially simultaneously on the two touchscreen displays 11 and 21 may mean, although there may be a difference depending on the performance of the touchscreen displays 11 and 21, that the first touch input 601 and the second touch input 602 occur at a time interval of about 10 ms to 20 ms.

The event determination region may be, for example, a region having a circular shape, including a region of the first touchscreen display 11 and a region of the second touchscreen display 21. If a first touch input occurring on the first touchscreen display 11 and a second touch input occurring on the second touchscreen display 21 are in the event determination region, the electronic device 100 may identify the two touch inputs as a single touch event.

Referring to 710 in FIG. 7A, with reference to the first touchscreen display 11, the second touchscreen display 21 may be opened/closed while being open by about 270°. In this case, the user may make a first touch input 701 and a second touch input 702 substantially simultaneously in the region of boundary between the first touchscreen display 11 and the second touchscreen display 21.

Referring to 712 in FIG. 7A, the first touch input 701 and the second touch input 702 by the user may not contact the touch input region 741 of the first touchscreen display 11 and the touch input region 742 of the second touchscreen display 21. The touch input regions 741 and 742 may refer to a touch screen panel (TSP), for example. Therefore, the electronic device 100 may determine that a case in which the first touchscreen display 11 and the second touchscreen display 21 are opened/closed in this manner corresponds to a state in which the first touch input 701 and the second touch input 702 made on the first touchscreen display 11 and the second touchscreen display 21, respectively, cannot be identified as a single touch event.

Referring to 720 in FIG. 7B, with reference to the first touchscreen display 11, the second touchscreen display 21 may be opened/closed while being open by about 190°. In this case, the user may make a first touch input 701 and a second touch input 702 substantially simultaneously in the region of boundary between the first touchscreen display 11 and the second touchscreen display 21.

Referring to 722 in FIG. 7B, the first touch input 701 and the second touch input 702 by the user may contact the touch input region 741 of the first touchscreen display 11 and the touch input region 742 of the second touchscreen display 21 substantially simultaneously. Therefore, the electronic device 100 may determine that a case in which the first touchscreen display 11 and the second touchscreen display 21 are opened/closed in this manner corresponds to a state in which an event determination region 750 is determined as to include a partial region of the first touchscreen display 11 and a partial region the second touchscreen display 21, and in which a signal corresponding to the first touch input 701 and a signal corresponding to the second touch input 702, occurring in the event determination region 750, can be identified as a single touch event.

Referring to 730 in FIG. 7C, with reference to the first touchscreen display 11, the second touchscreen display 21 may be opened/closed while being open by about 160°. In this case, the user may make a first touch input 701 and a second touch input 702 substantially simultaneously in the region of boundary between the first touchscreen display 11 and the second touchscreen display 21.

Referring to 732 in FIG. 7C, the first touch input 701 and the second touch input 702 by the user may contact the touch input region 741 of the first touchscreen display 11 and the touch input region 742 of the second touchscreen display 21 substantially simultaneously. Therefore, the electronic device 100 may determine that a case in which the first touchscreen display 11 and the second touchscreen display 21 are opened/closed in this manner corresponds to a state in which an event determination region 750 is determined so as to include a partial region of the first touchscreen display 11 and a partial region the second touchscreen display 21, and in which a signal corresponding to the first touch input 701 and a signal corresponding to the second touch input 702, occurring in the event determination region 750, can be identified as a single touch event.

According to various embodiments, the area of the event determination region in which the electronic device 100 recognizes a first touch input and a second touch input as a single touch event may vary depending on the state of opening/closing of displays. For example, as in FIG. 7B and FIG. 7C, the smaller the angle between the first touchscreen display 11 and the second touchscreen display 21, the larger the area of the event determination region 750 in which the first touch input and the second touch input are recognized as a single touch event.

According to various embodiments, upon identifying that the first touchscreen display 11 and the second touchscreen display 21 are opened/closed so as to form an angle of about 50-70° therebetween, the electronic device 100 may not activate the event determination region and may deactivate the operation of recognizing a signal corresponding to the first touch input and a signal corresponding to the second touch input as a single touch event.

Figure 8:
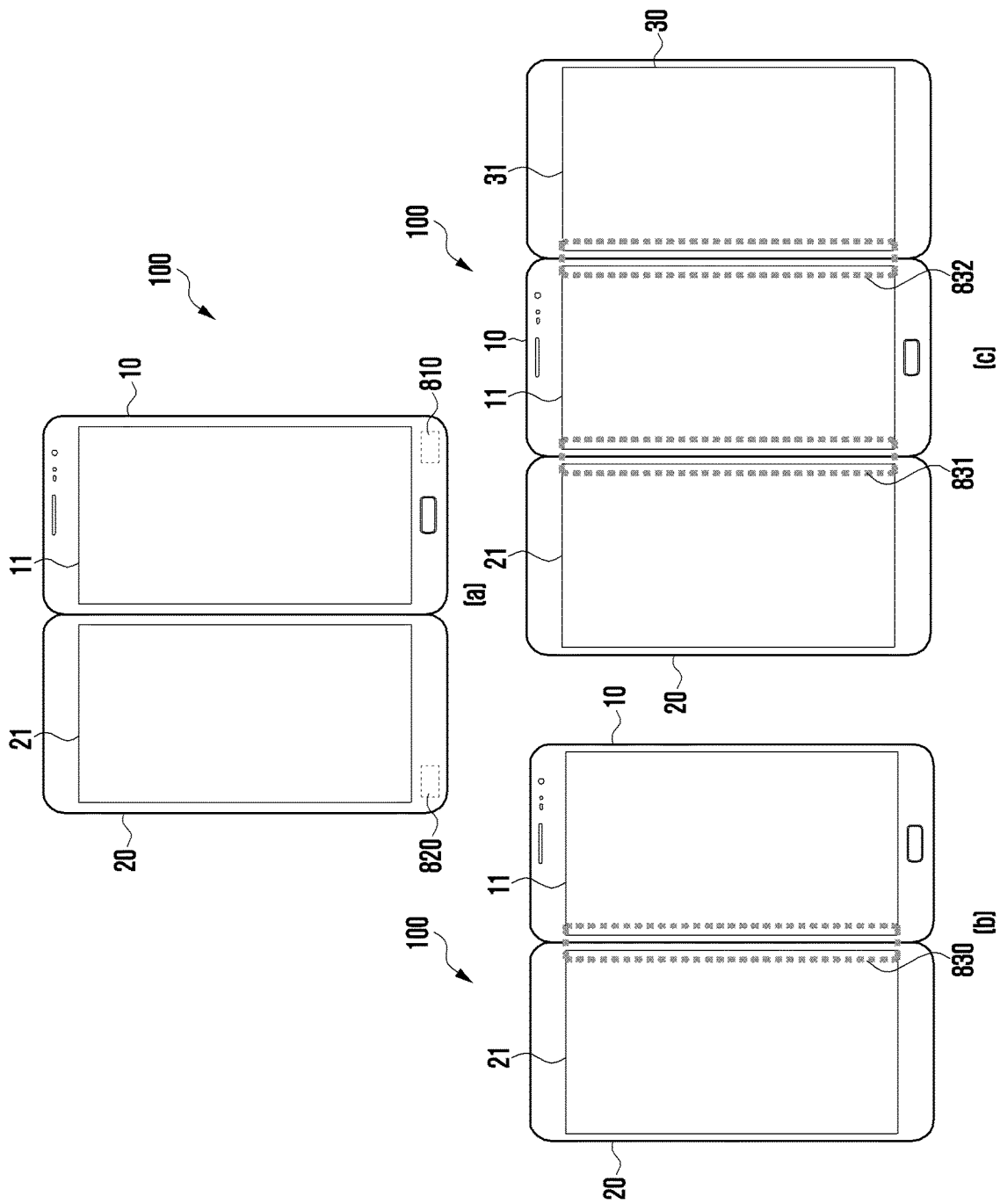
FIG. 8B to FIG. 8C illustrate a situation in which a touch input identification region is determined according to the angle of a display.

FIG. 8 illustrates a method for identifying the state of opening/closing of multiple touchscreen displays by an electronic device and a method for selecting a region in which a touch event is determined thereby.

Referring to FIG. 8A, the electronic device 100 may include a sensor capable of identifying the state of opening/closing of multiple displays 11 and 21.

Referring to FIG. 8A, a Hall sensor 810 may be disposed inside an edge region of a first housing 10 in which a first touchscreen display 11 according to various embodiments is disposed, and a magnetic body 820 may be disposed inside an edge region of a second housing 20, in which a second touchscreen display 21 is disposed.

According to various embodiments, the Hall sensor 810 may sense a magnetic field produced by the magnetic body 820 by using the tendency that the voltage thereof changes according to the intensity of the magnetic field. Accordingly, the edge region of the first housing 10 in which the Hall sensor 810 is disposed and the edge region of the second housing 20 in which the magnetic body 820 is disposed approach each other in such a direction they face each other, when the first housing 10 and the second housing 20 are closed, and the Hall sensor 810 may thereby sense the magnetic field produced by the magnetic body 820. For example, if the intensity of the magnetic field sensed by the Hall sensor 810 increases, the same may correspond to a state in which the first touchscreen display 11 disposed on the first housing 10 and the second touchscreen display 21 disposed on the second housing 20 are closed. As another example, if the intensity of the magnetic field sensed by the Hall sensor 810 decreases when the first housing 10 and the second housing 20 are opened, the same may correspond to a state in which the first touchscreen display 11 disposed on the first housing 10 and the second touchscreen display 21 disposed on the second housing 20 are opened.

According to various embodiments, the electronic device 100 may determine activation or deactivation of the first touchscreen display 11 and the second touchscreen display 21, based on a sensing value produced by the Hall sensor.

The electronic device 100 according to various embodiments may determine a touch input identification region in which a process for determining touch inputs occurring on displays as a single touch event is performed according to the angle between the first touchscreen display 11 and the second touchscreen display 21. For example, according to various embodiments, the electronic device 100 may perform a process in which, if multiple touch inputs are produced in the touch input identification region successively or substantially identically, the multiple touch inputs are determined as a single touch event. As another example, if the angle at which the first touchscreen display 11 disposed on the first housing 10 and the second touchscreen display 21 disposed on the second housing 20 face each other is 45°-150°, the electronic device 100 may determine a touch input identification region in the region of boundary between the first touchscreen display 11 and the second touchscreen display 21.

FIG. 8B to FIG. 8C illustrate a situation in which a touch input identification region is determined according to the angle of a display.

Referring to FIG. 8B, the electronic device 100 according to an embodiment may include two touchscreen displays. Referring to FIG. 8B, the electronic device 100 may include a first housing 10, a second housing 20, a first touchscreen display 11, and a second touchscreen display 21.

According to an embodiment, the first housing 10 and the second housing 20 may rotate around a region in which they are connected to each other. For example, the electronic device 100 may determine a touch input identification region 830 including a region of the first touchscreen display 11 and a region of the second touchscreen display 21 around the region in which the first housing 10 and the second housing 20 are connected to each other.

Referring to FIG. 8C, the electronic device 100 may include a first housing 10, a second housing 20, a third housing 30, a first touchscreen display 11, a second touchscreen display 21, and a third touchscreen display 31. According to an embodiment, the first housing 10 and the second housing 20 may rotate around a region in which they are connected to each other, and the first housing 10 and the third housing 30 may also rotate around a region in which they are connected to each other. The electronic device 100 may determine a touch input identification region around the region in which the housings are connected to each other.

For example, the electronic device 100 may determine a first touch input identification region 831 including a region of the first touchscreen display 11 and a region of the second touchscreen display 21, and may determine a second touch input identification region 832 including another region of the first touchscreen display 11 and a region of the third touchscreen display 31.

According to various embodiments, configuration of touch input identification regions 830, 831, and 832 in which the electronic device 100 performs a process of determining the first touch input and the second touch input as a single touch event may vary depending on the state of activation of the displays. For example, the electronic device 100 may determine no touch input identification region if the displays are deactivated, although they may be open.

Figure 9:
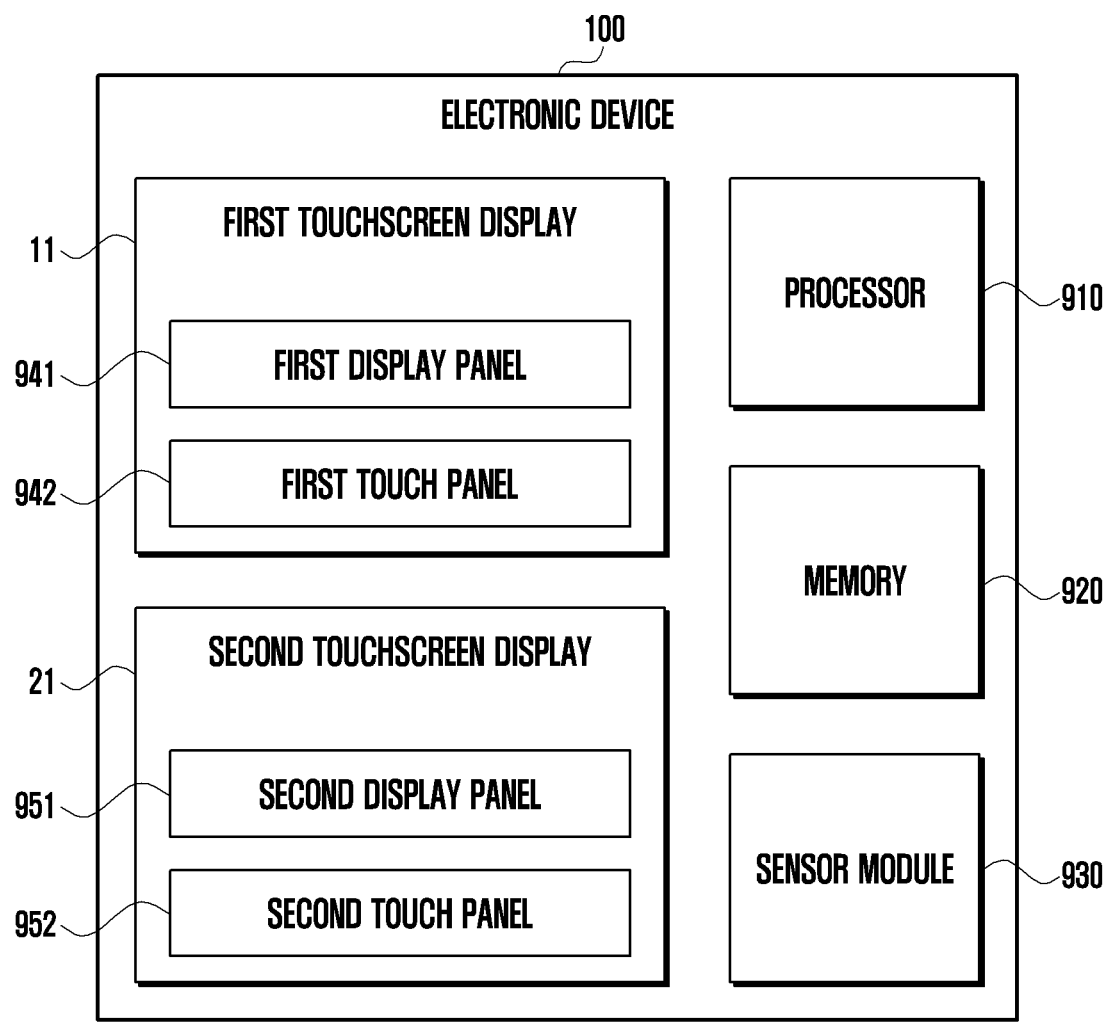
FIG. 9 is a block diagram of an electronic device regarding a touch input according to an embodiment.

FIG. 9 is a block diagram of an electronic device regarding a touch input according to an embodiment.

According to various embodiments, the electronic device 100 including multiple touchscreen displays (for example, first touchscreen display 11 and second touchscreen display 21) may operate respective touchscreen displays independently or may operate at least two touchscreen displays among the multiple touchscreen displays as a single touchscreen display. For example, the electronic device 100 may output different application execution screens on respective touchscreen displays or may divide an application execution screen into multiple regions and may output execution screens corresponding to respective divided regions on respective touchscreen displays, thereby operating the multiple touchscreen displays as a single touchscreen display.

Referring to FIG. 9, the electronic device 100 according to various embodiments may include a first touchscreen display 11, a second touchscreen display 21, a processor 910, a memory 920, and a sensor module 930. However, components of the electronic device 100 are not limited thereto. According to various embodiments, at least one of the above-mentioned components of the electronic device 100 may be omitted, and the same may further include at least one different component. For example, the electronic device 100 may further include at least one display (for example, third display) other than the first touchscreen display 11 and the second touchscreen display 21.

According to an embodiment, the first touchscreen display 11 and the second touchscreen display 21 may display various kinds of contents (for example, texts, images, videos, icons, or symbols) to the user. The first touchscreen display 11 or the second touchscreen display 21 may include, for example, a liquid crystal display (LCD), a light-emitting diode (LED) display, an organic LED (OLED) display, or a microelectromechanical system (MEMS) display, or an electronic paper display.

According to an embodiment, each of the first touchscreen display 11 and the second touchscreen display 21 may include a display panel and a display driver IC (DDI) configured to control the display panel. For example, the first touchscreen display 11 may include a first display panel 941 and a first DDI (not illustrated) configured to control the first display panel 941, and the second touchscreen display 21 may include a second display panel 951 and a second DDI (not illustrated) configured to control the second display panel 951.

According to an embodiment, the display panels (for example, first display panel 941 and second display panel 951) may include multiple pixels, and each pixel may include subpixels displaying the three primary colors of light (RGB). Each subpixel may include at least one transistor, and may adjust the pixels and express colors according to the magnitude of voltage applied to the transistor (or current flowing through the same). The DDIs (for example, first DDI and second DDI) may include a gate driver circuit unit which has an on/off function, and which controls gates of the subpixels, and a source driver circuit unit which adjusts image signals of the subpixels, thereby making a difference in color, such that the DDIs provide a full screen while adjusting transistors of the subpixels. The DDIs may receive image data from the processor 910 and operate such that images are displayed on the display panels.

According to an embodiment, by using a display buffer (or frame buffer) corresponding to multiple pixels (and subpixels) included in the display panels, the DDIs may control the multiple pixels so as to express colors. For example, if the processor 910 stores image data in the display buffer, the DDIs may control the multiple pixels to express colors by using the image data stored in the display buffer.

According to an embodiment, at least one of the display panels included in the first touchscreen display 11 and the second touchscreen display 21 may be implemented to be flat, flexible, or bendable.

According to an embodiment, in connection with embodiments of an electronic device 100 including multiple displays, at least a part of contents (for example, image data, image data stream, and the like) changing in various modules and devices of the electronic device 100 may be processed by using the processor 910. The processor 910 may determine to output the changing contents to at least one of the first touchscreen display 11 or the second touchscreen display 21. For example, the processor 910 may cause the first touchscreen display 11 to output an execution screen for a first application stored in the memory 920, and may cause the second touchscreen display 21 to output an execution screen for a second application stored in the memory 920. In another embodiment, the processor 910 may display an image output to the first touchscreen display 11 after switching (or expanding) the same to the second touchscreen display 21, or may display an image output to the second touchscreen display 21 after switching (or expanding) the same to the first touchscreen display 11. For example, the processor 910 may cause the first touchscreen display 11 and the second touchscreen display 21 to divide and then output an execution screen for an application stored in the memory 920.

According to an embodiment, each of the first touchscreen display 11 and the second touchscreen display 21 may include a touch panel and a touch control circuit configured to control the touch panel. For example, the first touchscreen display 11 may include a first touch panel 942 and a first touch control circuit (not illustrated) configured to control the first touch panel 942, and the second touchscreen display 21 may include a second touch panel 952 and a second touch control circuit (not illustrated) configured to control the first touch panel 952. For example, the first touchscreen display 11 and the second touchscreen display 21 may operate as touchscreens.

According to an embodiment, the touch panels (for example, first touch panel 942 and second touch panel 452) may sense the touch or approach of a touch object (for example, a part of the user's body or an electronic pen). The touch panels may be provided as panels having sensing electrodes made of a conductive material and formed in a lattice structure. For example, the touch panels may acquire touch information (for example, touch position and the like) by using a change in capacitance resulting from the touch object contacting or approaching the sensing electrodes. However, the type in which the touch panels sense the contact or approach of the touch object is not limited to the above-mentioned capacitance type. According to various embodiments, the touch panels may sense the contact or approach of the touch object in a pressure type, a resistance type, an infrared type, a soundwave type, an optical type, an electromagnetic induction type, or the like.

According to an embodiment, the touch panels may measure a physical quantity changed by the contact or approach of the touch object (for example, amount of change in capacitance), and may transfer the measured physical quantity to the touch control circuits.

According to an embodiment, the touch control circuits may analyze the transferred physical quantity and may determine whether or not a touch input has occurred. In addition, the touch control circuits may analyze the transferred physical quantity and may acquire touch information such as the position or area of the touch input. In this case, the touch control circuits may transfer the acquired touch information to the processor 910. In some embodiments, the touch control circuits may transfer the transferred physical quantity to the processor 910 with no modification, or may partially process the same and transfer the resulting raw data to the processor 910. In this case, the processor 910 may analyze the transferred data and may acquire touch information such as the position or area of the touch input.

According to an embodiment, the touch control circuits may store at least one of the measured physical quantity as it is, raw data obtained by partially processing the measured physical quantity, or touch information acquired by analyzing the physical quantity, in touch buffers corresponding to touch coordinates of the touch panels. In this case, the processor 910 may acquire touch information regarding touch inputs by using data stored in the touch buffers.

According to various embodiments, the touch control circuits may further include a touch sensing controller (not illustrated) and a memory (not illustrated). In this case, user input information may be determined by using signal values that are input through the touch panels. In addition, the touch sensing controller may determine the type of a gesture that the user has input by using the user input information.

For example, the touch sensing controller may determine that signal values that have been input are gesture information by using gesture information prestored in the memory.

According to an embodiment, the display panels and the touch panels may be provided as a single module.

The processor 910 may include one or more of a central processing unit (CPU), an application processor (AP), or a communication processor (CP). The processor 910 may perform computing or data processing related to control and/or communication of at least one different component of the electronic device 100. The processor 910 may drive an operating system or an application program, for example, so as to control multiple hardware or software components connected to the processor 910 and to perform various kinds of data processing and computing. According to an embodiment, the processor 910 may further include a graphical processing unit (GPU) and/or an image signal processor.

According to an embodiment, the processor 910 may analyze data corresponding to the physical quantity measured through the touch panels, thereby determining whether or not a touch input has occurred. In addition, the processor 910 may determine touch information regarding the touch input, such as the number of touch inputs, the position of touch inputs, the time at which touch inputs have occurred, and the duration of touch inputs. In some embodiments, the processor 910 may receive touch information acquired through analysis of the measured physical quantity from the touch control circuits.

According to an embodiment, the processor 910 may process a touch input as if a virtual touch panel obtained by integrating the first touch panel 942 and the second touch panel 952 exists. For example, the processor 910 may convert first data (for example, first raw data) corresponding to a first touch input acquired through the first touch panel 942 and second data (for example, second raw data) corresponding to a second touch input acquired through the second touch panel 952 into pieces of data (for example, first virtual data and second virtual data) corresponding to multiple touch inputs occurring on the virtual touch panel.

According to an embodiment, the processor 910 may produce a virtual touch driver including instructions related to operation control of the virtual touch panel such that the virtual touch panel can realistically operate as if touch panels (for example, first touch panel 942 and second touch panel 952) that are physically real, and may register (or install) the produced virtual touch driver in the memory 920 (for example, middleware (or framework)). The virtual touch driver may include, for example, instructions that cause the virtual touch panel to process a first touch input occurring in a first coordinate region corresponding to the first touch panel 942 and a second touch input occurring in a second coordinate region corresponding to the second touch panel 952 as if they occur in a virtual third coordinate region obtained by integrating the first coordinate region and the second coordinate region. In some embodiments, the virtual touch driver may be configured such that, according to the characteristics of an application occupying the screen of displays (for example, first touchscreen display 11 and second touchscreen display 21), the third coordinate region corresponds to the first coordinate region, the third coordinate region corresponds to the second coordinate region, or the third coordinate region corresponds to the entire coordinate region obtained by integrating the first coordinate region and the second coordinate region. According to an embodiment, the processor 910 may produce and register the virtual touch driver during booting of the electronic device 100.

According to an embodiment, the memory 920 may include a volatile memory and/or a nonvolatile memory. The memory 920 may store commands or data related to at least one different component of the electronic device 100. According to an embodiment, the memory 920 may store instructions related to touch input processing. Accordingly, if the instructions are executed by the processor 920, the processor 910 may perform a function related to touch input processing. In addition, the memory 920 may store at least one application. The memory 920 may include an internal memory or an external memory.

According to an embodiment, the sensor module 930 may produce an electric signal or a data value corresponding to the internal operating state (for example, power or temperature) of the electronic device 100, or to the external environment state. According to an embodiment, the sensor module 930 may measure a physical quantity that changes according to the state of opening/closing of the first touchscreen display 11 and the second touchscreen display 21, and may transfer the measured physical quantity to the processor 910. In this case, the processor 910 may analyze the transferred physical quantity, thereby determining the state of opening/closing of the first touchscreen display 11 and the second touchscreen display 21.

According to an embodiment, the sensor module 930 may include a Hall sensor. The Hall sensor may sense a magnetic field produced by a magnetic body by using the tendency that the voltage thereof changes according to the intensity of the magnetic field. According to an embodiment, the first touchscreen display 11 and the second touchscreen display 21 may be disposed on a first housing and a second housing, respectively, which forms the exterior of the electronic device 100, and the first housing and the second housing may rotate around one side thereof such that they can be opened/closed. In addition, the Hall sensor may be disposed inside an edge region of the first housing, and the magnetic body may be disposed inside an edge region of the second housing. The edge region of the first housing, in which the Hall sensor is disposed, and the edge region of the second housing, in which the magnetic body is disposed, approach in such a direction that they face each other when the first housing and the second housing are closed, and the Hall sensor may accordingly sense the magnetic field produced by the magnetic body. That is, if the intensity of the magnetic field sensed by the Hall sensor increases, the same may be regarded as corresponding to a state in which the first housing and the second housing are closed, and if the intensity of the magnetic field sensed by the Hall sensor decreases, the same may be regarded as corresponding to a state in which the first housing and the second housing are opened.

Figure 10:
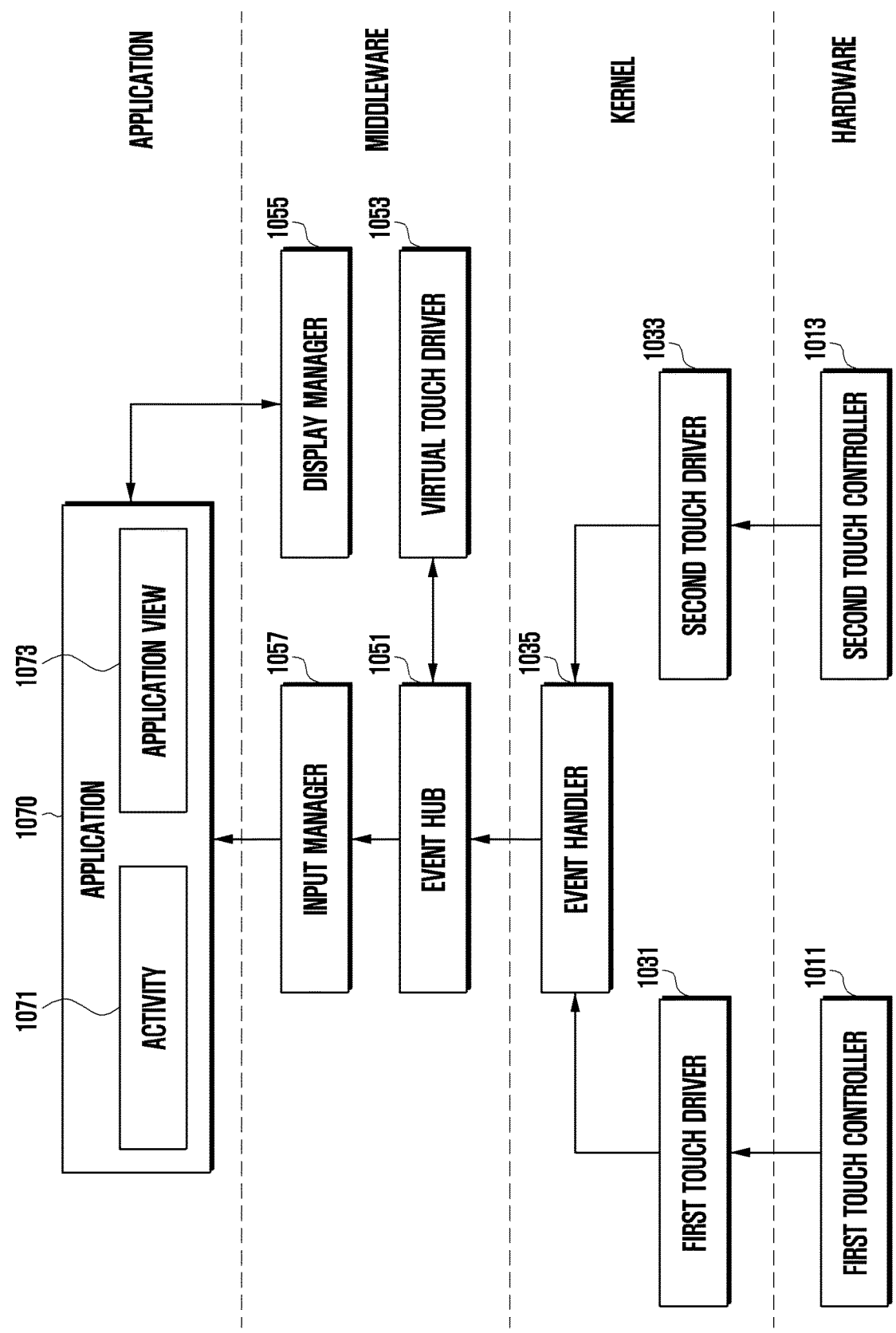
FIG. 10 is a system configuration diagram of an electronic device having multiple touchscreen displays according to an embodiment.

FIG. 10 is a system configuration diagram of an electronic device having multiple touchscreen displays according to an embodiment.

Referring to FIG. 10, the electronic device 100 according to various embodiments may include hardware and software. The hardware may include a hardware device mounted on or connected to the electronic device 100 and a hardware controller configured to control the hardware device. According to an embodiment, the hardware may include an input device and an input device controller configured to control the input device. The input device may include, for example, a touch input device. Although the hardware is illustrated in FIG. 10 as including a first touch controller 1011 configured to control a first touch input device and a second touch controller 1013 configured to control a second touch input device, this is not limiting in any manner.

According to various embodiments, the first touch controller 1011 and the second touch controller 1013 may include components corresponding to the touch control circuits described with reference to FIG. 9. For example, the first touch controller 1011 and the second touch controller 1013 may control a first touch panel (for example, first touch panel 942) and a second touch panel (for example, second touch panel 952). The first touch controller 1011 and the second touch controller 1013 may receive physical quantities that change according to the contact or approach of a touch object from the first touch panel and the second touch panel, respectively, and may transfer the transferred physical quantities to a processor (for example, processor 910) with no modification, may transfer raw data obtained by partially processing the same to the processor, or may transfer touch information acquired by analyzing the physical quantities thereto. In this case, the processor may process the transferred data (or information), and the operation of the processor processing the data (or information) may be performed by executing a program (or a set of instructions) defined by respective components included in the software.

According to various embodiments, the software may include a kernel, middleware (or framework), and an application. The kernel may control or manage system resources used to execute an operation or a function implemented in another piece of software, for example. In addition, the kernel may access individual components of the electronic device 100 through the middleware/application, thereby providing an interface that makes it possible to control or manage the system resources.

According to various embodiments, the kernel may include, for example, a first touch driver 1031, a second touch driver 1033, and an event handler 1035. The first touch driver 1031 and the second touch driver 1033 may include instructions related to operation control of the first touch controller 1011 and the second touch controller 1013, respectively. The event handler 1035 may map an input received through an input device to an event (or a signal) defined by the deriver of the input device, and may transfer the mapped event to an event hub 1051 included in the middleware. For example, if a first touch input is received through the first touch panel, the first touch controller 1011 may transfer data (or information) regarding the first touch input to the event handler 1035, based on instructions defined in the touch driver 1031. In addition, the event handler 1035 may map data (or information) regarding the first touch input to a touch event, and may transfer the mapped touch event to the event hub 1051. Alternatively, if a second touch input is received through the second touch panel, the second touch controller 1013 may transfer data (or information) regarding the second touch input to the event handler 1035, based on instructions defined in the second touch driver 1033. In addition, the event handler 1035 may map data (or information) regarding the second touch input to a touch event, and may transfer the mapped touch event to the event hub 1051.

According to various embodiments, the middleware (or framework) may play a mediator role such that the application, for example, can communicate with the kernel and exchange data therewith. In addition, the middleware may process one or more work requests received from the application according to a priority. For example, the middleware may assign a priority to at least one application 1070 included in the application such that the same can use system resources of the electronic device 100, and may process the one or more work requests. The middleware may include an event hub 1051, a virtual touch driver 1053, a display manager 1055, and an input manager 1057.

According to various embodiments, the event hub 1051 may transfer an event transferred from the event handler 1035 to at least one application 1070 included in the application. For example, the event hub 1051 may transfer the event to an application 1070 registered so as to receive the event.

According to an embodiment, the event hub 1051 may differently process an event transferred from the event handler 1035 according to the characteristics of the application 1070. For example, if the application 1070 occupies only a screen region (first coordinate region) of the first display corresponding to the first touch panel, the event hub 1051 may transfer only a touch event related to the first touch input occurring on the first touch panel, among events transferred from the event handler 1035, to the application 1070. As another example, if the application 1070 occupies only a screen region (second coordinate region) of the second display corresponding to the second touch panel, the event hub 1051 may transfer only a touch event related to the second touch input occurring on the second touch panel, among events transferred from the event handler 1035, to the application 1070. As still another example, if the application 1070 both the screen region (first coordinate region) of the first display and the screen region (second coordinate region) of the second display, the event hub 1051 may transfer all events transferred from the event handler 1035 to the application 1070. In this case, the event hub 1051 may process the events co as to correspond to a virtual third coordinate region obtained by integrating the first coordinate region and the second coordinate region, and may transfer the same to the application 1070. For example, the event hub 1051 may process information regarding a first touch input occurring in the first coordinate region and information regarding a second touch input occurring in the second coordinate region as if they have occurred in the third coordinate region. For example, the event hub 1051 may change the touch coordinate at which the first touch input has occurred and the touch coordinate at which the second touch input has occurred so as to correspond to the third coordinate region, respectively.

According to various embodiments, the virtual touch driver 1053 may include instructions related to operation control of the virtual touch panel such that the virtual touch panel can operate realistically as if a physically existing touch panel. The virtual touch driver 1053 may include instructions that, for example, cause the virtual touch panel so as to process a first touch input occurring in the first coordinate region corresponding to the first touch panel and a second touch input occurring in the second coordinate region corresponding to the second touch panel as if they have occurred in a virtual third coordinate region obtained by integrating the first coordinate region and the second coordinate region. According to an embodiment, the virtual touch driver 1503 may be produced and registered during booting of the electronic device 100.

According to various embodiments, the display manager 1055 may manage a graphic effect to be provided to the user, or a user interface related thereto. The display manager 1055 may manage system resources used to display an execution screen for the application 1070 on a display. The display manager 1055 may configure or acquire the screen size of the display. In addition, the display manager 1055 may configure the screen according to the size of an application view 1073 defined by the application 1070.

According to various embodiments, the input manager 1057 may sense and register an input device registered in the kernel, may receive an input event occurring in the input device through the event hub 1051, and may control the input device. For example, the input manager 1057 may sense and register a touch panel registered in the kernel, may receive a touch input event occurring in the registered touch panel through the event hub 1051, and may control the touch panel. In addition, the input manager 1057 may identify whether or not a virtual touch panel is available in the current state, and may produce and register a virtual touch driver 1053 if a virtual touch panel is available in the current state. In some embodiments, the input manager 1057 may produce and register a virtual touch driver 1053 during booting.

According to various embodiments, the application may include at least one application 1070. The application 1070 may include instructions configured to perform a designated function through a user interface. The application 1070 may include an activity 1071 and an application view 1073. The activity 1071 may perform an interaction with the user via the user interface, and may request another activity 1071 to provide data or a service. The application view 1073 may manage configuration information or resources for configuring a screen. For example, the application view 1073 may manage screen size, layout information, and the like.

Figure 11:
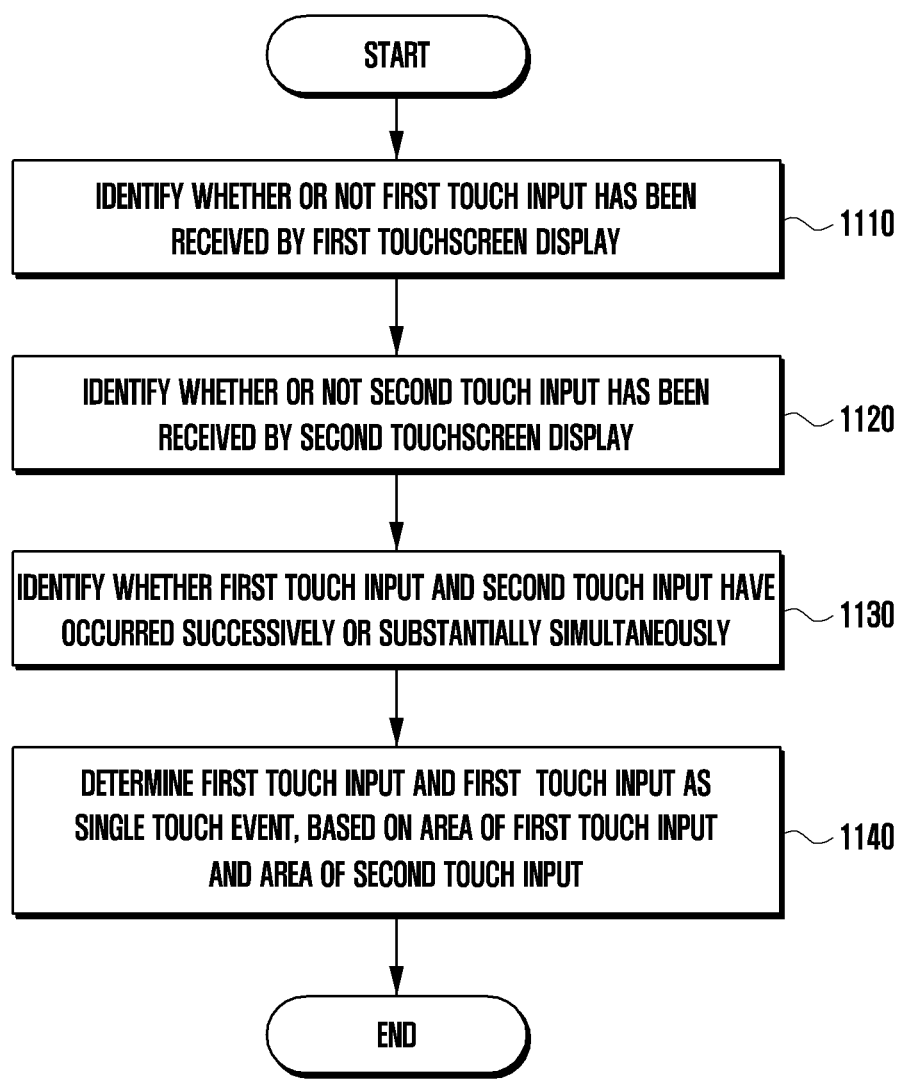
FIG. 11 is a flowchart describing a situation in which an electronic device according to an embodiment processes a touch event according to the area of an occurring touch input.

FIG. 11 is a flowchart describing a situation in which an electronic device according to an embodiment processes a touch event according to the area of an occurring touch input.

Referring to operation 1110, the electronic device 100 according to various embodiments may identify whether or not a first touch input has been received by a first touchscreen display.

For example, a first touch panel (for example, first touch panel 942 in FIG. 9) included in a first touchscreen display (for example, first touchscreen display 11 in FIG. 9) may sense a change in the physical quantity (for example, change in capacitance) resulting from a first touch input produced on the first touchscreen display (for example, first touchscreen display 11 in FIG. 9) by the user. The first touch panel (for example, first touch panel 942 in FIG. 9) may transfer the measured physical quantity to a first touch control circuit.

The first touch control circuit may acquire touch information of the first touch input, such as the position or area of the first touch input, by using the physical quantity. The first touch control circuit may transfer the touch information of the first touch input to a processor (for example, processor 910 in FIG. 9). The processor (for example, processor 910 in FIG. 9) may identify whether or not the first touch input has been received by the first touchscreen display (for example, first touchscreen display 11 in FIG. 9).

Referring to operation 1120, the electronic device 100 according to various embodiments may identify whether or not a second touch input has been received by a second touchscreen display.

For example, a second touch panel (for example, second touch panel 952 in FIG. 9) included in a second touchscreen display (for example, second touchscreen display 21 in FIG. 9) may sense a change in the physical quantity (for example, change in capacitance) resulting from a second touch input produced on the second touchscreen display (for example, second touchscreen display 21 in FIG. 9) by the user. The second touch panel (for example, second touch panel 952 in FIG. 9) may transfer the measured physical quantity to a second touch control circuit.

The second touch control circuit may acquire touch information of the second touch input, such as the position or area of the second touch input, by using the physical quantity. The second touch control circuit may transfer the touch information of the second touch input to the processor (for example, processor 910 in FIG. 9). The processor (for example, processor 910 in FIG. 9) may identify whether or not the second touch input has been received by the second touchscreen display (for example, second touchscreen display 21 in FIG. 9).

Referring to operation 1130, the electronic device 100 according to various embodiments may identify whether the first touch input and the second touch input have occurred successively or substantially simultaneously.

For example, the processor (for example, processor 910 in FIG. 9) of the electronic device 100 may identify whether the first touch input and the second touch input have occurred successively or substantially simultaneously, by using the touch information of the first touch input and the touch information of the second touch input.

Referring to operation 1140, the electronic device 100 according to various embodiments may determine the first touch input and the second touch input as a single touch event, based on the area of the first touch input and the area of the second touch input.

For example, upon identifying that the area of the first touch input and/or the area of the second touch input are continuously identical or increase, the processor (for example, processor 910 in FIG. 9) of the electronic device 100 may determine the first touch input and the second touch input as a single touch event corresponding to successively dragging the first touchscreen display and the second touchscreen display.

Figure 12:
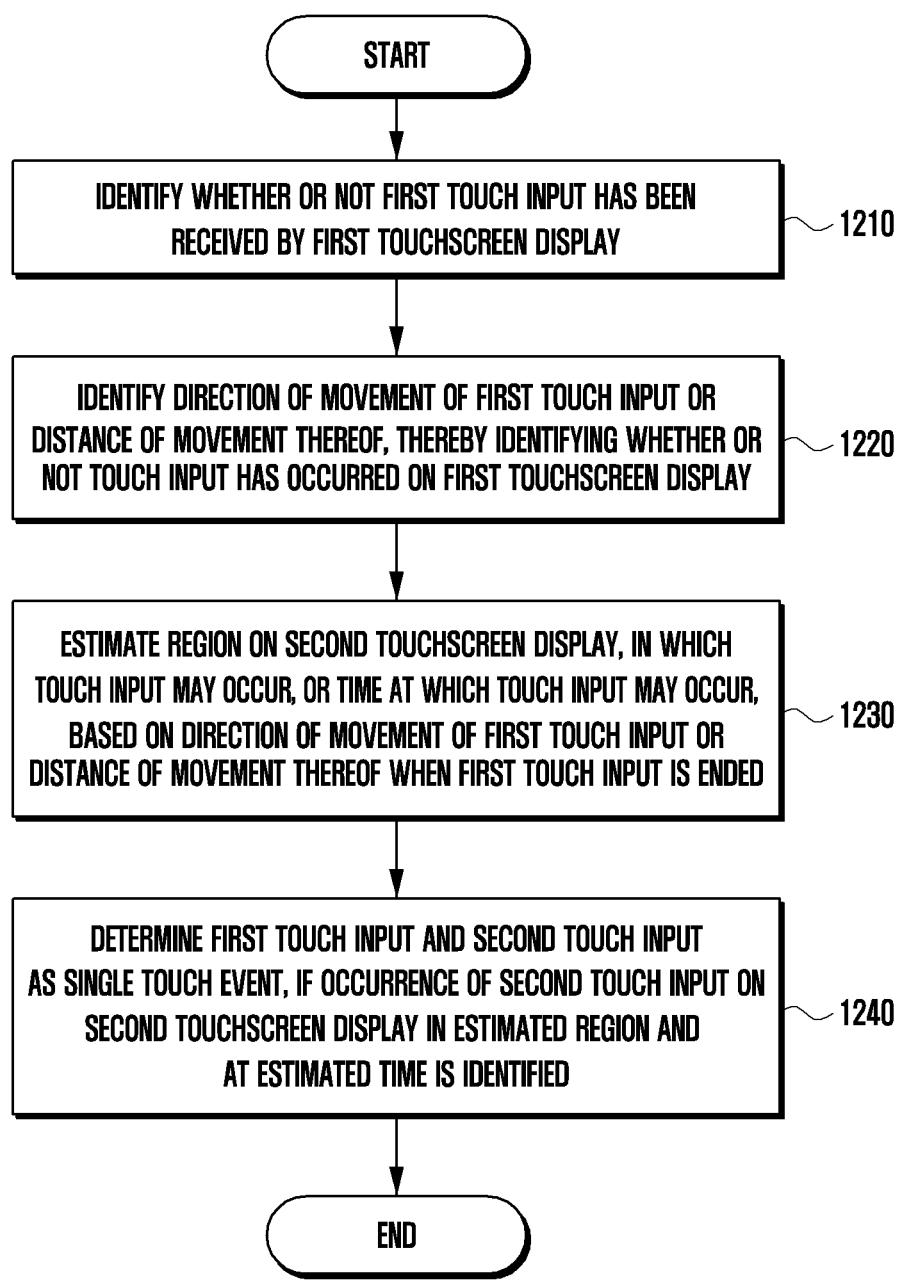
FIG. 12 is a flowchart describing a situation in which an electronic device according to an embodiment processes a touch event according to the direction of movement of a touch input or the distance of movement thereof.

FIG. 12 is a flowchart describing a situation in which an electronic device according to an embodiment processes a touch event according to the direction of movement of a touch input or the distance of movement thereof.

Referring to operation 1210, the electronic device 100 according to various embodiments may identify whether or not a first touch input has been received by a first touchscreen display.

For example, a first touch panel (for example, first touch panel 942 in FIG. 9) included in a first touchscreen display (for example, first touchscreen display 11 in FIG. 9) may sense a change in the physical quantity (for example, change in capacitance) resulting from a first touch input produced on the first touchscreen display (for example, first touchscreen display 11 in FIG. 9) by the user. The first touch panel (for example, first touch panel 942 in FIG. 9) may transfer the measured physical quantity to a first touch control circuit.

The first touch control circuit may acquire touch information of the first touch input, such as the position or area of the first touch input, by using the physical quantity. The first touch control circuit may transfer the touch information of the first touch input to a processor (for example, processor 910 in FIG. 9). The processor (for example, processor 910 in FIG. 9) may identify whether or not the first touch input has been received by the first touchscreen display (for example, first touchscreen display 11 in FIG. 9).

Referring to operation 1220, the electronic device 100 according to various embodiments may identify the direction of movement of the first touch input or the distance of movement thereof, thereby estimating whether or not a touch input has occurred on a second touchscreen display.

For example, the first touch panel (for example, first touch panel 942 in FIG. 9) included in the first touchscreen display (for example, first touchscreen display 11 in FIG. 9) may periodically sense a change in the physical quantity resulting from the first touch input by the user. The first touch control circuit may periodically acquire touch information of the first touch input, such as the position to which the first touch input has moved, or the area thereof, by using the physical quantity periodically received from the first touch panel (for example, first touch panel 942 in FIG. 9). The first touch control circuit may transfer the touch information of the first touch input, which is produced periodically, to a processor (for example, processor 910 in FIG. 9). The processor (for example, processor 910 in FIG. 9) may identify the direction of movement of the first touch input or the distance of movement thereof by using the received touch information of the first touch input, thereby estimating whether or not a touch input has occurred on a second touchscreen display (for example, second touchscreen display 21 in FIG. 9).

Referring to operation 1230, the electronic device 100 according to various embodiments may estimate the region on the second touchscreen display, in which a touch input may occur, or the time at which a touch input may occur, based on the direction of movement of the first touch input or the distance of movement thereof, when the first touch input is ended.

For example, the processor (for example, processor 910 in FIG. 9) of the electronic device 100 may estimate the region on the second touchscreen display (for example, second touchscreen display 21 in FIG. 9), in which a touch input may occur, or the time at which a touch input may occur, based on the direction of movement of the first touch input or the distance of movement thereof.

Referring to operation 1240, the electronic device 100 according to various embodiments may determine the first touch input and the second touch input as a single touch event, if the occurrence of the second touch input on the second touchscreen display in the estimated region and at the estimated time is identified.

For example, the processor (for example, processor 910 in FIG. 9) of the electronic device 100 may determine the first touch input and the second touch input as a single touch event, if the occurrence of the second touch input on the second touchscreen display (for example, second touchscreen display 21 in FIG. 9) in the estimated region and at the estimated time is identified.

A control method according to an embodiment may include the operations of: receiving a signal corresponding to a first touch input through a first touchscreen display and, successively or substantially simultaneously, receiving a signal corresponding to a second touch input through a second touchscreen display; and determining the signal corresponding to the first touch input and the signal corresponding to the second touch input as a single touch event, based on at least one of the area of the first touch input or the area of the second touch input.

The control method according to an embodiment may include the operation of: determining the signal corresponding to the first touch input and the signal corresponding to the second touch input as a single touch event, in case that the area of the first touch input is identical or increases in a situation in which the position of the first touch input is moved.

The control method according to an embodiment may include the operation of: estimating whether or not the second touch input occurs on the second touchscreen display, based on at least one of the direction in which the position of the first touch input is moved or the distance of movement thereof.

The control method according to an embodiment may include the operation of: estimating at least one of the region on the second touchscreen display, in which the second touch input is sensed, or the time at which the second touch input may be sensed, based on at least one of the direction in which the position of the first touch input is moved or the distance of movement thereof, as a result of ending of the first touch input on the first touchscreen display.

The control method according to an embodiment may include the operation of: determining the signal corresponding to the first touch input and the signal corresponding to the second touch input as a single touch event, as a result of the second touch input occurring in the region estimated for the second touch input on the second touchscreen display.

The control method according to an embodiment may include the operation of: determining the signal corresponding to the first touch input and the signal corresponding to the second touch input as a single touch event, as a result of the second touch input occurring within the time estimated for the second touch input on the second touchscreen display.

The control method according to an embodiment may include the operation of: determining the signal corresponding to the first touch input and the signal corresponding to the second touch input as a single touch event flicking on the first touchscreen display as a result of the area of the first touch input decreasing in a situation in which the position of the first touch input is moved.

The control method according to an embodiment may include the operation of: determining, in a situation in which the signal corresponding to the first touch input and the signal corresponding to the second touch input are received substantially simultaneously, a signal corresponding to a touch input occurring on a touchscreen display, on which a touch input having a larger area between the area of the first touch input and the area of the second touch input has occurred, as a single touch event.

The control method according to an embodiment may include the operation of: determining a touch input identification region in which an operation of determining the signal corresponding to the first touch input and the signal corresponding to the second touch input as a single touch event is performed, based on at least one of whether or not the first touchscreen display and the second touchscreen display are activated or the state of disposition thereof.

Figure 13:
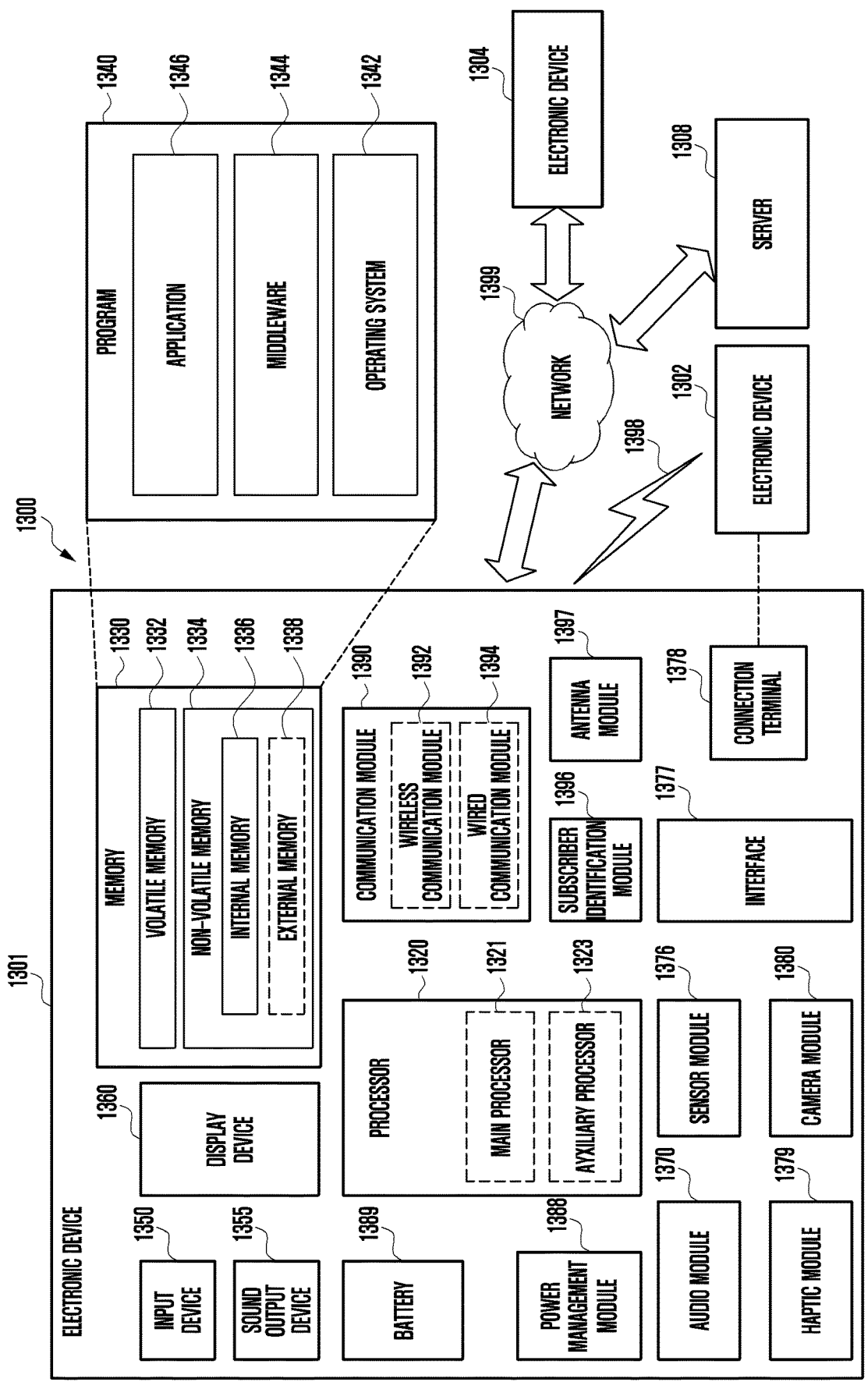
FIG. 13 is a bock diagram of an electronic device for identifying an activity of a user of the electronic device according to the embodiments as disclosed herein.

FIG. 13 is a block diagram illustrating an electronic device in a network environment according to various embodiments. the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the electronic device 1301, or one or more other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the electronic device 1301, from the outside (e.g., a user) of the electronic device 1301. The input device 1350 may include, for example, a microphone, a mouse, a keyboard, or a digital pen (e.g., a stylus pen).

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC.

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. In such a case, at least one antenna appropriate for a communication scheme used in the communication network, such as the first network 1398 or the second network 1399, may be selected, for example, by the communication module 190 (e.g., the wireless communication module 1392) from the plurality of antennas. The signal or the power may then be transmitted or received between the communication module 1390.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

An electronic device according to an embodiment may include: a first touchscreen display; a second touchscreen display; a processor; and a memory. The memory may store instructions configured to cause the processor, when executed, to determine, in case that a signal corresponding to a first touch input is received through the first touchscreen display, and in case that a signal corresponding to a second touch input is received through the second touchscreen display successively or substantially simultaneously, the signal corresponding to the first touch input and the signal corresponding to the second touch input as a single touch event, based on at least one of the area of the first touch input or the area of the second touch input.

In connection with an electronic device according to an embodiment, the memory may store instructions configured to cause the processor, when executed, to determine the signal corresponding to the first touch input and the signal corresponding to the second touch input as a single touch event, in case that the area of the first touch input is identical or increases in a situation in which the position of the first touch input is moved.

In connection with an electronic device according to an embodiment, the memory may store instructions configured to cause the processor, when executed, to estimate whether or not the second touch input occurs on the second touchscreen display, based on at least one of the direction in which the position of the first touch input is moved or the distance of movement thereof.

In connection with an electronic device according to an embodiment, the memory may store instructions configured to cause the processor, when executed, to estimate at least one of the region on the second touchscreen display, in which the second touch input is sensed, or the time at which the second touch input is sensed, based on at least one of the direction in which the position of the first touch input is moved or the distance of movement thereof, in case that the first touch input on the first touchscreen display is ended.

In connection with an electronic device according to an embodiment, the memory may store instructions configured to cause the processor, when executed, to determine the signal corresponding to the first touch input and the signal corresponding to the second touch input as a single touch event, in case that the second touch input occurs in the region estimated for the second touch input on the second touchscreen display.

In connection with an electronic device according to an embodiment, the memory may store instructions configured to cause the processor, when executed, to determine the signal corresponding to the first touch input and the signal corresponding to the second touch input as a single touch event, in case that the second touch input is sensed within the time estimated for the second touch input on the second touchscreen display.

In connection with an electronic device according to an embodiment, the memory may store instructions configured to cause the processor, when executed, to determine the signal corresponding to the first touch input and the signal corresponding to the second touch input as a single touch event flicking on the first touchscreen display, if the area of the first touch input decreases in a situation in which the position of the first touch input is moved.

In connection with an electronic device according to an embodiment, the memory may store instructions configured to cause the processor, when executed, to determine, in a situation in which the signal corresponding to the first touch input and the signal corresponding to the second touch input are received substantially simultaneously, a signal corresponding to a touch input occurring on a touchscreen display, on which a touch input having a larger area between the area of the first touch input and the area of the second touch input has occurred, as a single touch event.

In connection with an electronic device according to an embodiment, the electronic device may further include a Hall sensor, and the memory may store instructions configured to cause the processor, when executed, to identify at least one of whether or not the first touchscreen display and the second touchscreen display are activated or the state of disposition thereof, by using the Hall sensor.

In connection with an electronic device according to an embodiment, the memory may store instructions configured to cause the processor, when executed, to determine a touch input identification region in which an operation of determining the signal corresponding to the first touch input and the signal corresponding to the second touch input as a single touch event is performed, based on at least one of whether or not the first touchscreen display and the second touchscreen display are activated or the state of disposition thereof.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 100, 1301). For example, a processor (e.g., the processor 1110, 1320) of the machine (e.g., the electronic device 100,1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, the computer program product comprising comprising a computer-readable recording medium storing instructions for executing, in a computer receiving a signal corresponding to a first touch input through a first touchscreen display and, successively or substantially simultaneously, receiving a signal corresponding to a second touch input through a second touchscreen display; and determining the signal corresponding to the first touch input and the signal corresponding to the second touch input as a single touch event, based on at least one of the area of the first touch input or the area of the second touch input.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising: a first touchscreen display; a second touchscreen display; a processor; and a memory, wherein the memory is configured to store instructions configured to cause the processor, when executed, to determine, in case that a signal corresponding to a first touch input is received through the first touchscreen display, and in case that a signal corresponding to a second touch input is received through the second touchscreen display successively or substantially simultaneously, the signal corresponding to the first touch input and the signal corresponding to the second touch input as a single touch event in case that an area of the first touch input is identical or increases in a situation in which a position of the first touch input is moved, based on at least one of the area of the first touch input or an area of the second touch input, wherein the memory is configured to store instructions configured to cause the processor, when executed, to estimate whether or not the second touch input occurs on the second touchscreen display, based on at least one of a direction in which the position of the first touch input is moved or a distance of movement thereof.

2. The electronic device as claimed in claim 1, wherein the memory is configured to store instructions configured to cause the processor, when executed, to estimate at least one of a region on the second touchscreen display, in which the second touch input is sensed, or a time at which the second touch input is sensed, based on at least one of the direction in which the position of the first touch input is moved or the distance of movement thereof, in case that the first touch input on the first touchscreen display is ended.

3. The electronic device as claimed in claim 2, wherein the memory is configured to store instructions configured to cause the processor, when executed, to determine the signal corresponding to the first touch input and the signal corresponding to the second touch input as a single touch event, in case that the second touch input occurs in the region estimated for the second touch input on the second touchscreen display.

4. The electronic device as claimed in claim 2, wherein the memory is configured to store instructions configured to cause the processor, when executed, to determine the signal corresponding to the first touch input and the signal corresponding to the second touch input as a single touch event, in case that the second touch input is sensed within the time estimated for the second touch input on the second touchscreen display.

5. The electronic device as claimed in claim 1, wherein the memory is configured to store instructions configured to cause the processor, when executed, to determine the signal corresponding to the first touch input and the signal corresponding to the second touch input as a single touch event flicking on the first touchscreen display, if the area of the first touch input decreases in the situation in which the position of the first touch input is moved.

6. The electronic device as claimed in claim 1, wherein the memory is configured to store instructions configured to cause the processor, when executed, to determine, in the situation in which the signal corresponding to the first touch input and the signal corresponding to the second touch input are received substantially simultaneously, a signal corresponding to a touch input occurring on the first touchscreen display or second touchscreen display, on which a touch input having a larger area between the area of the first touch input and the area of the second touch input has occurred, as a single touch event.

7. The electronic device as claimed in claim 1, wherein the electronic device further comprises a Hall sensor, and the memory is configured to store instructions configured to cause the processor, when executed, to identify at least one of whether or not the first touchscreen display and the second touchscreen display are activated or a state of disposition thereof, by using the Hall sensor.

8. The electronic device as claimed in claim 7, wherein the memory is configured to store instructions configured to cause the processor, when executed, to determine a touch input identification region in which an operation of determining the signal corresponding to the first touch input and the signal corresponding to the second touch input as a single touch event is performed, based on at least one of whether or not the first touchscreen display and the second touchscreen display are activated or the state of disposition thereof.

9. A method for controlling an electronic device, the method comprising:
receiving a signal corresponding to a first touch input through a first touchscreen display and, successively or substantially simultaneously, receiving a signal corresponding to a second touch input through a second touchscreen display; and
determining the signal corresponding to the first touch input and the signal corresponding to the second touch input as a single touch event in case that an area of the first touch input is identical or increases in a situation in which a position of the first touch input is moved, based on at least one of the area of the first touch input or an area of the second touch input,
wherein the determining the signal corresponding to the first touch input and the signal corresponding to the second touch input as a single touch event comprises: estimating whether or not the second touch input occurs on the second touchscreen display, based on at least one of a direction in which the position of the first touch input is moved or a distance of movement thereof.

10. The method as claimed in claim 9, wherein the estimating whether or not the second touch input occurs comprises: estimating at least one of a region on the second touchscreen display, in which the second touch input is sensed, or a time at which the second touch input may be sensed, based on at least one of the direction in which the position of the first touch input is moved or the distance of movement thereof, as a result of ending of the first touch input on the first touchscreen display.

11. The method as claimed in claim 10, wherein the determining the signal corresponding to the first touch input and the signal corresponding to the second touch input as a single touch event comprises: determining the signal corresponding to the first touch input and the signal corresponding to the second touch input as a single touch event, as a result of the second touch input occurring in the region estimated for the second touch input on the second touchscreen display.

12. The method as claimed in claim 10, wherein the determining the signal corresponding to the first touch input and the signal corresponding to the second touch input as a single touch event comprises: determining the signal corresponding to the first touch input and the signal corresponding to the second touch input as a single touch event, as a result of the second touch input occurring within the time estimated for the second touch input on the second touchscreen display.

13. The method as claimed in claim 9, wherein the determining the signal corresponding to the first touch input and the signal corresponding to the second touch input as a single touch event comprises: determining the signal corresponding to the first touch input and the signal corresponding to the second touch input as a single touch event flicking on the first touchscreen display as a result of the area of the first touch input decreasing in the situation in which the position of the first touch input is moved.

14. The method as claimed in claim 9, wherein the determining the signal corresponding to the first touch input and the signal corresponding to the second touch input as a single touch event comprises: determining, in the situation in which the signal corresponding to the first touch input and the signal corresponding to the second touch input are received substantially simultaneously, a signal corresponding to a touch input occurring on the first touchscreen display or second touchscreen display, on which a touch input having a larger area between the area of the first touch input and the area of the second touch input has occurred, as a single touch event.

15. The method as claimed in claim 9, wherein the determining the signal corresponding to the first touch input and the signal corresponding to the second touch input as a single touch event comprises: determining a touch input identification region in which an operation of determining the signal corresponding to the first touch input and the signal corresponding to the second touch input as a single touch event is performed, based on at least one of whether or not the first touchscreen display and the second touchscreen display are activated or a state of disposition thereof.

16. A computer program product comprising a non-transitory computer-readable recording medium storing instructions for executing, in a computer: receiving a signal corresponding to a first touch input through a first touchscreen display and, successively or substantially simultaneously, receiving a signal corresponding to a second touch input through a second touchscreen display; and determining the signal corresponding to the first touch input and the signal corresponding to the second touch input as a single touch event in case that an area of the first touch input is identical or increases in a situation in which a position of the first touch input is moved, based on at least one of the area of the first touch input or an area of the second touch input, wherein the determining the signal corresponding to the first touch input and the signal corresponding to the second touch input as a single touch event comprises: estimating whether or not the second touch input occurs on the second touchscreen display, based on at least one of a direction in which the position of the first touch input is moved or a distance of movement thereof.

* * * * *